(12) United States Patent
Sato

(10) Patent No.: US 8,942,924 B2
(45) Date of Patent: Jan. 27, 2015

(54) TRAVEL GUIDANCE SYSTEM, TRAVEL GUIDANCE APPARATUS, TRAVEL GUIDANCE METHOD, AND COMPUTER PROGRAM

(75) Inventor: Yuji Sato, Owariasahi (JP)

(73) Assignee: Aisin Aw Co., Ltd., Aichi-ken (JP)

(*) Notice: Subject to any disclaimer, the term of this patent is extended or adjusted under 35 U.S.C. 154(b) by 68 days.

(21) Appl. No.: 13/536,181

(22) Filed: Jun. 28, 2012

(65) Prior Publication Data

US 2013/0013200 A1 Jan. 10, 2013

(30) Foreign Application Priority Data

Jul. 7, 2011 (JP) ................................. 2011-150792

(51) Int. Cl.
*G01C 21/36* (2006.01)
*G08G 1/0968* (2006.01)

(52) U.S. Cl.
CPC ........ *G01C 21/3626* (2013.01); *G01C 21/3629* (2013.01); *G01C 21/3655* (2013.01); *G08G 1/096872* (2013.01)
USPC ............................ 701/516; 701/428; 701/431

(58) Field of Classification Search
None
See application file for complete search history.

(56) References Cited

U.S. PATENT DOCUMENTS

| 7,949,468 B2* | 5/2011 | Nakayama et al. ........... 701/423 |
|---|---|---|
| 2002/0010543 A1 | 1/2002 | Watanabe et al. |
| 2007/0106459 A1* | 5/2007 | Nakayama et al. ........... 701/201 |
| 2007/0124068 A1* | 5/2007 | Nakayama et al. ........... 701/210 |
| 2008/0243382 A1* | 10/2008 | Chu .............................. 701/211 |
| 2010/0026804 A1* | 2/2010 | Tanizaki et al. ............... 348/148 |

FOREIGN PATENT DOCUMENTS

| JP | 2001-324345 A | 11/2001 | |
|---|---|---|---|
| JP | 2002-156242 A | 5/2002 | |
| JP | 2003-121185 A | 4/2003 | |
| JP | 2003-279367 A | 10/2003 | |
| JP | 2007-155352 A | 6/2007 | |
| WO | WO 2008/140168 A1 * | 11/2008 | ........... G08G 1/0962 |

OTHER PUBLICATIONS

Green, "In-vehicle information: Design of driver interfaces for route guidance", TRB Annual Meeting, Transportation Research Board, 1996.*

* cited by examiner

*Primary Examiner* — John R Olsezewski
*Assistant Examiner* — Todd Melton
(74) *Attorney, Agent, or Firm* — Sughrue Mion, PLLC

(57) ABSTRACT

A travel guidance system and method are provided. The travel guidance system includes a navigation-route setting unit that sets a navigation route, a guidance junction on the navigation route and a junction acquiring unit that acquires a position of a preceding junction that is located closer to a departure place of the navigation route than the guidance junction. The system also includes a guidance setting unit that sets guidance on the guidance junction and a junction guiding unit that provides guidance on the guidance junction on the basis of the guidance set by the guidance setting unit. The system is configured such that the guidance includes a first phrase for specifying a positional relationship between the movable body and the preceding junction and a second phrase for specifying a positional relationship between the movable body and the guidance junction after the movable body has passed through the preceding junction.

15 Claims, 13 Drawing Sheets

F I G . 2
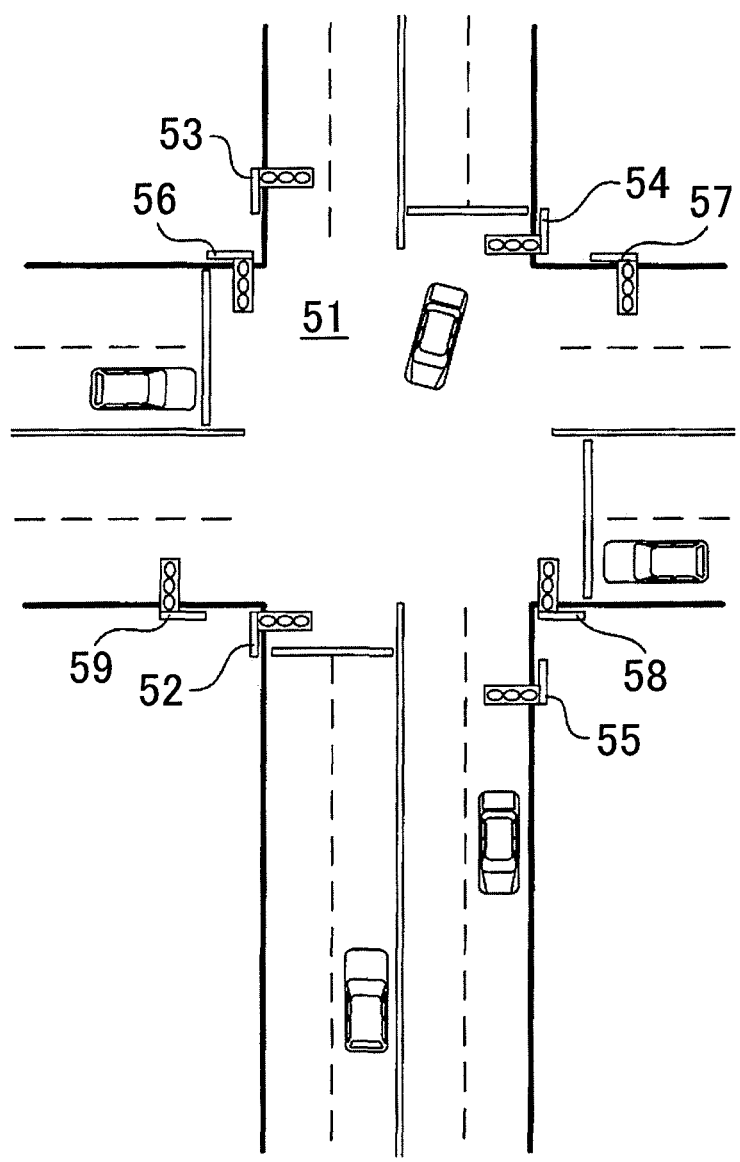

FIG. 3A

GUIDANCE PHRASE CONDITION TABLE — 32

| TYPE | GUIDANCE CANDIDATE (DETAIL OF VOICE TO BE OUTPUT) | REQUIRED OUTPUT TIME | GUIDANCE START SECTION | GUIDANCE END SECTION |
|---|---|---|---|---|
| ORDINARY | TURN LEFT (RIGHT) AT THIRD TRAFFIC LIGHT | 4 SECONDS | BETWEEN "POINT 5 METERS SHORT OF EXIT-SIDE TRAFFIC LIGHT AT THIRD PRECEDING JUNCTION" AND "POINT 50 METERS SHORT OF ACCESS-SIDE TRAFFIC LIGHT AT SECOND PRECEDING JUNCTION" | SAME AS GUIDANCE START SECTION |
| | TURN LEFT (RIGHT) AT SECOND TRAFFIC LIGHT | 4 SECONDS | BETWEEN "POINT 5 METERS SHORT OF EXIT-SIDE TRAFFIC LIGHT AT SECOND PRECEDING JUNCTION" AND "POINT 50 METERS SHORT OF ACCESS-SIDE TRAFFIC LIGHT AT FIRST PRECEDING JUNCTION" | SAME AS GUIDANCE START SECTION |
| | TURN LEFT (RIGHT) AT NEXT TRAFFIC LIGHT | 4 SECONDS | BETWEEN "POINT 5 METERS SHORT OF EXIT-SIDE TRAFFIC LIGHT AT FIRST PRECEDING JUNCTION" AND "POINT 50 METERS SHORT OF ACCESS-SIDE TRAFFIC LIGHT AT GUIDANCE JUNCTION" | SAME AS GUIDANCE START SECTION |

FIG. 3B
GUIDANCE PHRASE CONDITION TABLE

| TYPE | GUIDANCE CANDIDATE (DETAIL OF VOICE TO BE OUTPUT) | REQUIRED OUTPUT TIME | GUIDANCE START SECTION | GUIDANCE END SECTION |
|---|---|---|---|---|
| SPECIAL A | TURN LEFT (RIGHT) AT SECOND TRAFFIC LIGHT FOLLOWING TRAFFIC LIGHT DIRECTLY AHEAD | 6 SECONDS | BETWEEN "(i) POINT 100 METERS SHORT OF ACCESS-SIDE TRAFFIC LIGHT AT SECOND PRECEDING JUNCTION OR (ii) POINT 5 METERS SHORT OF EXIT-SIDE TRAFFIC LIGHT AT THIRD PRECEDING JUNCTION WHICHEVER IS CLOSER TO GUIDANCE JUNCTION" AND "POINT 5 METERS SHORT OF ACCESS-SIDE TRAFFIC LIGHT AT SECOND PRECEDING JUNCTION" | BETWEEN "(i) POINT 100 METERS SHORT OF ACCESS-SIDE TRAFFIC LIGHT AT SECOND PRECEDING JUNCTION OR (ii) POINT 5 METERS SHORT OF EXIT-SIDE TRAFFIC LIGHT AT THIRD PRECEDING JUNCTION WHICHEVER IS CLOSER TO GUIDANCE JUNCTION" AND "POINT 5 METERS SHORT OF EXIT-SIDE TRAFFIC LIGHT AT SECOND PRECEDING JUNCTION" |
| | TURN LEFT (RIGHT) AT NEXT TRAFFIC LIGHT FOLLOWING TRAFFIC LIGHT DIRECTLY AHEAD | 6 SECONDS | BETWEEN "(i) POINT 100 METERS SHORT OF ACCESS-SIDE TRAFFIC LIGHT AT FIRST PRECEDING JUNCTION OR (ii) POINT 5 METERS SHORT OF EXIT-SIDE TRAFFIC LIGHT AT SECOND PRECEDING JUNCTION WHICHEVER IS CLOSER TO GUIDANCE JUNCTION" AND "POINT 5 METERS SHORT OF ACCESS-SIDE TRAFFIC LIGHT AT FIRST PRECEDING JUNCTION" | BETWEEN "(i) POINT 100 METERS SHORT OF ACCESS-SIDE TRAFFIC LIGHT AT FIRST PRECEDING JUNCTION OR (ii) POINT 5 METERS SHORT OF EXIT-SIDE TRAFFIC LIGHT AT SECOND PRECEDING JUNCTION WHICHEVER IS CLOSER TO GUIDANCE JUNCTION" AND "POINT 5 METERS SHORT OF EXIT-SIDE TRAFFIC LIGHT AT FIRST PRECEDING JUNCTION" |

FIG. 3C
GUIDANCE PHRASE CONDITION TABLE 32

| TYPE | GUIDANCE CANDIDATE (DETAIL OF VOICE TO BE OUTPUT) | REQUIRED OUTPUT TIME | GUIDANCE START SECTION | GUIDANCE END SECTION |
|---|---|---|---|---|
| SPECIAL B | TURN LEFT (RIGHT) AT SECOND TRAFFIC LIGHT FOLLOWING CURRENT TRAFFIC LIGHT | 5 SECONDS | BETWEEN "(i) POINT 50 METERS SHORT OF ACCESS-SIDE TRAFFIC LIGHT AT SECOND PRECEDING JUNCTION OR (ii) POINT 5 METERS SHORT OF EXIT-SIDE TRAFFIC LIGHT AT THIRD PRECEDING JUNCTION WHICHEVER IS CLOSER TO GUIDANCE JUNCTION" AND "POINT 5 METERS SHORT OF EXIT-SIDE TRAFFIC LIGHT AT SECOND PRECEDING JUNCTION" | BETWEEN "POINT 5 METERS SHORT OF ACCESS-SIDE TRAFFIC LIGHT AT SECOND PRECEDING JUNCTION" AND "POINT 5 METERS SHORT OF ACCESS-SIDE TRAFFIC LIGHT AT FIRST PRECEDING JUNCTION" |
| | TURN LEFT (RIGHT) AT NEXT TRAFFIC LIGHT FOLLOWING CURRENT TRAFFIC LIGHT | 5 SECONDS | BETWEEN "(i) POINT 50 METERS SHORT OF ACCESS-SIDE TRAFFIC LIGHT AT FIRST PRECEDING JUNCTION OR (ii) POINT 5 METERS SHORT OF EXIT-SIDE TRAFFIC LIGHT AT SECOND PRECEDING JUNCTION WHICHEVER IS CLOSER TO GUIDANCE JUNCTION" AND "POINT 5 METERS SHORT OF EXIT-SIDE TRAFFIC LIGHT AT FIRST PRECEDING JUNCTION" | BETWEEN "POINT 5 METERS SHORT OF ACCESS-SIDE TRAFFIC LIGHT AT FIRST PRECEDING JUNCTION" AND "POINT 5 METERS SHORT OF ACCESS-SIDE TRAFFIC LIGHT AT GUIDANCE JUNCTION" |
| ... | ... | ... | ... | ... |

TRAVEL GUIDANCE SYSTEM, TRAVEL GUIDANCE APPARATUS, TRAVEL GUIDANCE METHOD, AND COMPUTER PROGRAM

INCORPORATION BY REFERENCE

This application claims priority from Japanese Patent Application No. 2011-150792 filed on Jul. 7, 2011 including the specification, drawings and abstract, the disclosure of which is incorporated herein by reference in its entirety.

BACKGROUND OF THE INVENTION

Aspects of the present invention relate to travel guidance systems, travel guidance apparatuses, travel guidance methods, and computer programs for guiding movable bodies along navigation routes.

DESCRIPTION OF THE RELATED ART

Recently, navigation systems that provide drivers with travel guidance have been installed in many vehicles so that the drivers can easily reach desired destinations. The term "navigation system" refers to a system that can detect the current positions of vehicles in which the navigation systems are installed using, for example, GPS receivers; acquire map data corresponding to the current positions via recording media such as DVD-ROMs and HDDs or via networks; and display the map data on liquid crystal monitors. Such a navigation system has a route search function of searching for an optimum route from a departure place to a destination on the basis of a desired destination input by a user. The navigation system displays a navigation route set on the basis of the search results on a display screen, and provides the user with guidance using voice and the display screen when the vehicle approaches junctions at which the user is to be instructed to, for example, turn right or left (hereinafter referred to as "guidance junctions") so as to reliably guide the user to the desired destination. Recently, some devices such as cellular phones, personal digital assistants (PDAs), and personal computers have also been provided with functions similar to those of the navigation systems, and are capable of providing guidance described as above for pedestrians and two-wheeled vehicles in addition to the vehicles.

When a user is instructed to, for example, turn right or left at a guidance junction, it is necessary for the user to correctly identify the guidance junction. In order for the user to correctly identify the guidance junction, guidance using junctions (preceding junctions) existing between the vehicle and the guidance junction may be provided for the user. However, in cases where guidance is provided using preceding junctions, it is especially important to appropriately set the timings to start and finish the guidance in accordance with details of the guidance compared with other guidance methods (for example, those using the distance between a movable body to a guidance junction). If the guidance is not provided at appropriate timings, the user may misidentify the guidance junction. For example, in cases where guidance using traffic lights installed at junctions such as "turn left at the second traffic light" is provided, it is desirable that the guidance be started after a traffic light at a junction next to the guidance junction on the near side of the guidance junction becomes invisible to the user and that the guidance be finished while a traffic light next to the guidance junction on the near side of the guidance junction is visible to the user.

For example, in a technology described in Japanese Patent Application Publication No. 2002-156242 (JP 2002-156242 A; pages 4 to 6, FIG. 3), the number of traffic lights is used for voice guidance on a guidance junction in cases where output of the voice guidance will be finished before the vehicle passes through a traffic light at the first preceding junction from the guidance junction on the near side of the guidance junction, and voice guidance is not provided in cases where the voice guidance will be not finished before the vehicle passes through the traffic light at the preceding junction.

SUMMARY OF THE INVENTION

In accordance with the technology described in JP 2002-156242 A, almost no voice guidance is provided in urban areas and the like where the intervals between junctions are small. However, it is more important for the user to correctly identify the guidance junction from the guidance in urban areas and the like where the intervals between junctions are small and thereby the user is likely to misidentify the guidance junction as compared to the suburbs where the intervals between junctions are large. The technology described in JP 2002-156242 A does not allow the user to correctly identify the guidance junction, and the user often loses the timing of turning right or left or runs off the navigation route.

It is an aspect of the present invention to solve the above-described problems, and an aspect of the present invention is to provide a travel guidance system, a travel guidance apparatus, a travel guidance method, and a computer program enabling a user to easily identify the positional relationship between a movable body and a preceding junction and the positional relationship between the movable body and a guidance junction and as a result enabling the user to correctly identify the guidance junction from guidance even when the intervals between junctions are small as often in, for example, urban areas.

To achieve the above-described aspect, a travel guidance system according to a first aspect of the present invention includes a navigation-route setting unit that sets a navigation route along which a movable body is guided and a guidance junction on the navigation route; a junction acquiring unit that acquires a position of a preceding junction that is located closer to a departure place of the navigation route than the guidance junction; a guidance setting unit that sets guidance on the guidance junction; and a junction guiding unit that provides guidance on the guidance junction on the basis of the guidance set by the guidance setting unit. The guidance setting unit sets the guidance such that the guidance includes a first phrase for specifying a positional relationship between the movable body and the preceding junction and a second phrase for specifying a positional relationship between the movable body and the guidance junction after the movable body has passed through the preceding junction.

The term "movable body" herein includes pedestrians and two-wheeled vehicles in addition to vehicles.

The term "guidance junction" herein corresponds to a junction at which a user of the system is instructed to, for example, turn right or left while the movable body is guided along the navigation route.

The term "position of the preceding junction" may indicate the position of the preceding junction, or may indicate the position of a feature (for example, a traffic light or a stop line) near the preceding junction.

The term "positional relationship between the movable body and the preceding junction" may indicate the positional relationship between the movable body and a feature (for example, a traffic light or a stop line) near the preceding junction.

The term "first phrase for specifying the positional relationship between the movable body and the preceding junction" may be a phrase for specifying the positional relationship between the movable body and the very preceding junction, or may be a phrase for specifying the positional relationship between the movable body and the preceding junction using a feature (for example, a traffic light or a stop line) near the preceding junction.

The term "second phrase for specifying the positional relationship between the movable body and the guidance junction" may be a phrase for specifying the positional relationship between the movable body and the guidance junction, or may be a phrase for specifying the positional relationship between the movable body and the guidance junction using a feature (for example, a traffic light or a stop line) near the guidance junction.

According to a second aspect, in the travel guidance system according to the first aspect, the preceding junction includes a first preceding junction and a second preceding junction that is located closer to the departure place of the navigation route than the first preceding junction, and the guidance setting unit sets the first phrase on the basis of a relative positional relationship between the first preceding junction and the second preceding junction.

The term "relative positional relationship between the first preceding junction and the second preceding junction" may indicate the positional relationship between the preceding junctions, or may be the positional relationships between features (for example, traffic lights and stop lines) near the preceding junctions.

According to a third aspect, the travel guidance system according to the first or second aspect includes a junction-number acquiring unit that acquires the number of junctions existing between the preceding junction and the guidance junction. The guidance setting unit sets a phrase for specifying the number of junctions acquired by the junction-number acquiring unit for the second phrase.

The term "phrase for specifying the number of junctions acquired by the junction-number acquiring unit" does not necessarily directly indicate the number of junctions existing between the preceding junction and the guidance junction, and may indirectly indicate the number. For example, the phrase may use the number of features (for example, traffic lights) installed at the junctions existing between the preceding junction and the guidance junction to allow the user to specify the number of junctions.

According to a fourth aspect, in the travel guidance system according to any one of the first to third aspects, the guidance setting unit sets a phrase indicating that the preceding junction is a junction through which the movable body is about to pass for the first phrase in cases where passage of the movable body through the preceding junction will not be completed while the guidance is provided by the junction guiding unit.

According to a fifth aspect, in the travel guidance system according to any one of the first to fourth aspects, the guidance setting unit sets a phrase indicating that the preceding junction is a junction through which the movable body is passing at the moment for the first phrase in cases where passage of the movable body through the preceding junction will be completed while the guidance is provided by the junction guiding unit.

According to a sixth aspect, in the travel guidance system according to any one of the first to fifth aspects, the junction guiding unit starts the guidance on the guidance junction when the movable body passes through a point specified by a position of the movable body relative to the preceding junction.

According to a seventh aspect, in the travel guidance system according to any one of the first to sixth aspects, the guidance setting unit sets the guidance such that the guidance includes the first phrase and the second phrase in cases where the guidance provided by the junction guiding unit will not be finished before the movable body reaches a point a predetermined distance short of the preceding junction, and sets the guidance such that the guidance includes a third phrase for specifying the positional relationship between the movable body and the guidance junction and does not include the first phrase and the second phrase in cases where the guidance provided by the junction guiding unit will be finished before the movable body reaches the point a predetermined distance short of the preceding junction.

A travel guidance apparatus according to an eighth aspect includes a navigation-route setting unit that sets a navigation route along which a movable body is guided and a guidance junction on the navigation route; a junction acquiring unit that acquires a position of a preceding junction that is located closer to a departure place of the navigation route than the guidance junction; a guidance setting unit that sets guidance on the guidance junction; and a junction guiding unit that provides guidance on the guidance junction on the basis of the guidance set by the guidance setting unit. The guidance setting unit sets the guidance such that the guidance includes a first phrase for specifying a positional relationship between the movable body and the preceding junction and a second phrase for specifying a positional relationship between the movable body and the guidance junction after the movable body has passed through the preceding junction.

A travel guidance method according to a ninth aspect includes, in cases where guidance on a guidance junction on a navigation route is provided using set guidance, setting guidance including a first phrase and a second phrase for the guidance on the guidance junction. The first phrase specifies a positional relationship between a movable body and a preceding junction that is located closer to a departure place of the navigation route than the guidance junction, and the second phrase specifies a positional relationship between the movable body and the guidance junction after the movable body has passed through the preceding junction.

A computer program according to a tenth aspect causing a computer to perform a navigation-route setting function of setting a navigation route along which a movable body is guided and a guidance junction on the navigation route; a junction acquiring function of acquiring a position of a preceding junction that is located closer to a departure place of the navigation route than the guidance junction; a guidance setting function of setting guidance on the guidance junction; and a junction guiding function of providing guidance on the guidance junction on the basis of the guidance set by the guidance setting function. The guidance setting function sets the guidance such that the guidance includes a first phrase for specifying a positional relationship between the movable body and the preceding junction and a second phrase for specifying a positional relationship between the movable body and the guidance junction after the movable body has passed through the preceding junction.

In the travel guidance system according to the first aspect having the above-described structure, the guidance on the guidance junction is provided using the guidance including the first phrase for specifying the positional relationship between the movable body and the preceding junction and the second phrase for specifying the positional relationship between the movable body and the guidance junction after the movable body has passed through the preceding junction. This enables the user to easily identify the position of the guidance junction from the guidance provided with consideration of the passage of the movable body through the preceding junction even when the intervals between junctions are small. Moreover, it is possible to prevent situations in which the guidance is not provided, which have often occurred in urban areas and the like when the intervals between the junctions are small, and the user can correctly identify the guidance junction. In addition, the user can identify the guidance junction more correctly compared with the case where the user is provided with guidance using the distance to the guidance junction.

In the travel guidance system according to the second aspect, the guidance on the guidance junction can be set by appropriately specifying both the positional relationship between the movable body and the preceding junction and the positional relationship between the movable body and the guidance junction after the movable body has passed through the preceding junction on the basis of the shapes of roads on the near side of the guidance junction. As a result, it is possible to reduce the load related to communication processing for acquiring information other than that relating to the shapes of the roads and the storage capacity required to store the information without performing complicated processing.

In the travel guidance system according to the third aspect, the guidance on the guidance junction is provided using the guidance including the second phrase for specifying the number of junctions between the movable body and the guidance junction after the movable body has passed through the preceding junction. This enables the user to easily identify the positional relationship between the movable body and the guidance junction from the number of junctions. As a result, the user can correctly identify the guidance junction.

In the travel guidance system according to the fourth aspect, the guidance on the guidance junction is provided using the phrase indicating that the preceding junction is a junction through which the movable body is about to pass in cases where passage of the movable body through the preceding junction will not be completed while the guidance on the guidance junction is provided. This enables the user to correctly identify the preceding junction indicated by the phrase in the guidance without confusing the preceding junction with another junction even when the intervals between junctions are small as often in, for example, urban areas. As a result, the user can correctly identify the guidance junction.

In the travel guidance system according to the fifth aspect, the guidance on the guidance junction is provided using the phrase indicating that the preceding junction is a junction through which the movable body is passing at the moment in cases where passage of the movable body through the preceding junction will be completed while the guidance on the guidance junction is provided. This enables the user to correctly identify the preceding junction indicated by the phrase in the guidance without confusing the preceding junction with another junction even when the intervals between junctions are small as often in, for example, urban areas. As a result, the user can correctly identify the guidance junction.

In the travel guidance system according to the sixth aspect, the guidance on the guidance junction is started when the movable body passes through the point determined from the position of the movable body relative to the preceding junction. This enables the guidance on the guidance junction to be started at appropriate time based on the details of the guidance phrase. As a result, the user can correctly identify the guidance junction.

In the travel guidance system according to the seventh aspect, the guidance on the guidance junction is provided using the guidance including the third phrase for specifying the positional relationship between the movable body and the guidance junction in cases where the guidance provided by the junction guiding unit will be finished before the movable body reaches the point a predetermined distance short of the preceding junction. That is, in cases where the intervals between the junctions are large, the guidance is provided using a simple phrase without any consideration of the passage of the movable body through the preceding junction. This enables the user to easily identify the positional relationship between the movable body and the guidance junction.

In the travel guidance apparatus according to the eighth aspect, the guidance on the guidance junction is provided using the guidance including the first phrase for specifying the positional relationship between the movable body and the preceding junction and the second phrase for specifying the positional relationship between the movable body and the guidance junction after the movable body has passed through the preceding junction. This enables the user to easily identify the position of the guidance junction from the guidance provided with consideration of the passage of the movable body through the preceding junction even when the intervals between junctions are small. Moreover, it is possible to prevent situations in which the guidance is not provided, which have often occurred in urban areas and the like when the intervals between the junctions are small, and the user can correctly identify the guidance junction. In addition, the user can identify the guidance junction more correctly compared with the case where the user is provided with guidance using the distance to the guidance junction.

In the travel guidance method according to the ninth aspect, the guidance on the guidance junction is provided using the guidance including the first phrase for specifying the positional relationship between the movable body and the preceding junction and the second phrase for specifying the positional relationship between the movable body and the guidance junction after the movable body has passed through the preceding junction. This enables the user to easily identify the position of the guidance junction from the guidance provided with consideration of the passage of the movable body through the preceding junction even when the intervals between junctions are small. Moreover, it is possible to prevent situations in which the guidance is not provided, which have often occurred in urban areas and the like when the intervals between the junctions are small, and the user can correctly identify the guidance junction. In addition, the user can identify the guidance junction more correctly compared with the case where the user is provided with guidance using the distance to the guidance junction.

In the computer program according to the tenth aspect, the guidance on the guidance junction is provided using the guidance including the first phrase for specifying the positional relationship between the movable body and the preceding junction and the second phrase for specifying the positional relationship between the movable body and the guidance junction after the movable body has passed through the preceding junction. This enables the user to easily identify the position of the guidance junction from the guidance provided with consideration of the passage of the movable body through the preceding junction even when the intervals between junctions are small. Moreover, it is possible to prevent situations in which the guidance is not provided, which have often occurred in urban areas and the like when the intervals between the junctions are small, and the user can correctly identify the guidance junction. In addition, the user can identify the guidance junction more correctly compared with the case where the user is provided with guidance using the distance to the guidance junction.

BRIEF DESCRIPTION OF THE DRAWINGS

FIG. 2 illustrates example traffic lights installed at a junction;

FIG. 3A illustrates part of an example guidance phrase condition table;

FIG. 3B illustrates part of the example guidance phrase condition table;

FIG. 3C illustrates part of the example guidance phrase condition table;

DETAILED DESCRIPTION OF THE EMBODIMENTS

Figure 1:
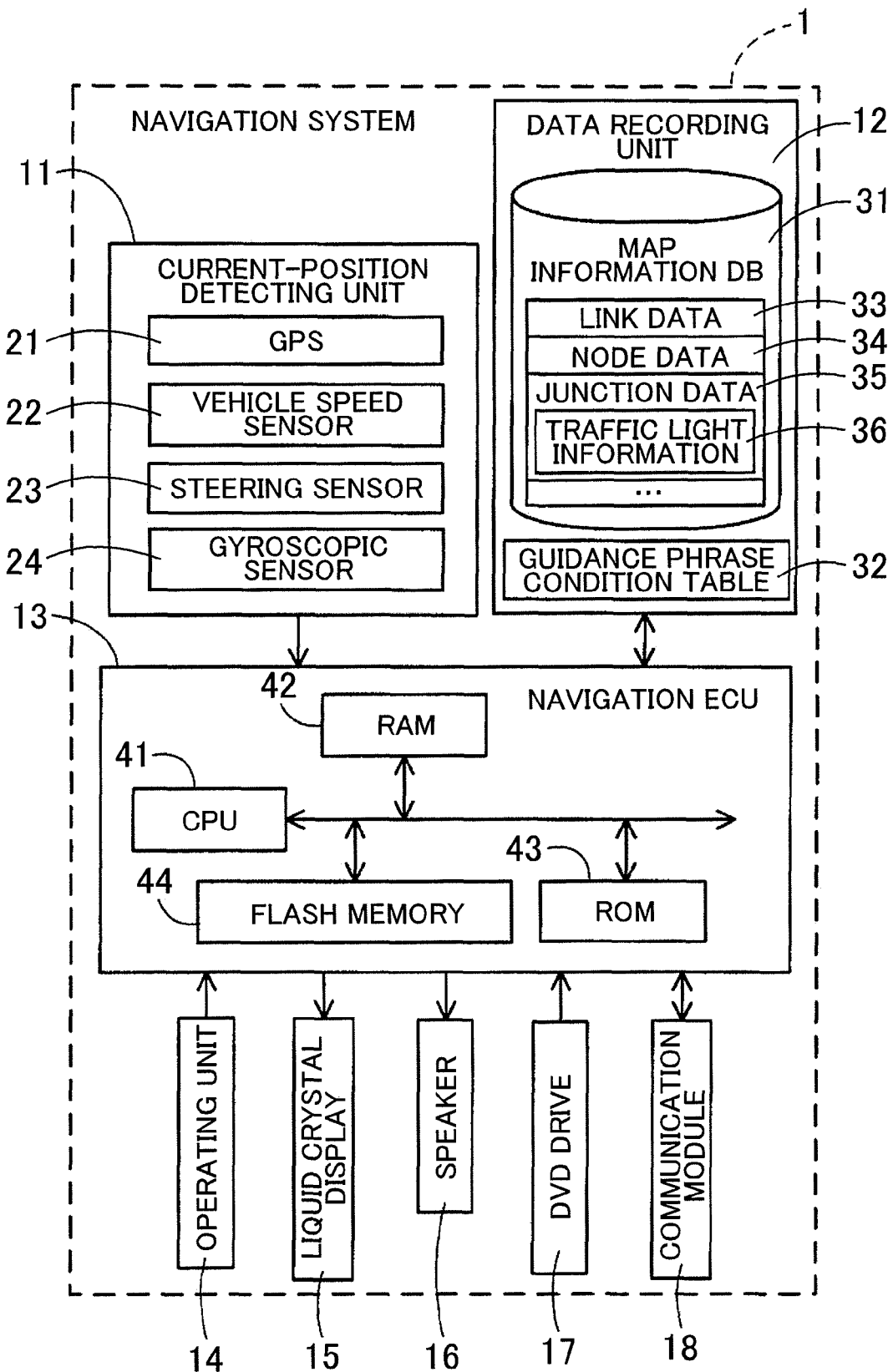
FIG. 1 is a block diagram of a navigation system according to an embodiment.

An embodiment of a travel guidance system and a travel guidance apparatus, embodied as a navigation system, will now be described in detail with reference to the drawings. First, the structure of a navigation system 1 according to this embodiment will be schematically described with reference to FIG. 1. FIG. 1 is a block diagram of the navigation system 1 according to this embodiment.

As illustrated in FIG. 1, the navigation system 1 according to this embodiment includes a current-position detecting unit 11 that detects the current position of a vehicle in which the navigation system 1 is installed, a data recording unit 12 that records various data, a navigation electronic control unit (ECU) 13 that performs various calculations on the basis of input information, an operating unit 14 that receives operations from users, a liquid crystal display 15 that displays a map of an area around the vehicle and facility information relating to facilities for the users, a speaker 16 that outputs voice guidance on navigation routes, a DVD drive 17 that reads DVDs serving as storage media, and a communication module 18 that communicates with information centers such as probe centers and the Vehicle Information and Communication System (VICS; registered trademark in Japan) center.

Components that constitute the navigation system 1 will now be described in sequence.

The current-position detecting unit 11 includes, for example, a GPS 21, a vehicle speed sensor 22, a steering sensor 23, and a gyroscopic sensor 24 to detect the current position, the orientation, and the travel speed of the vehicle, the current time, and other parameters. In particular, the vehicle speed sensor 22 detects the travel distance and the speed of the vehicle, and generates pulses in accordance with the rotation of driving wheels of the vehicle to output pulse signals to the navigation ECU 13. The navigation ECU 13 counts the generated pulses to calculate the rotational speed of the driving wheels and the travel distance. The navigation system 1 does not need to include all the five sensors described above, and may include only one or more sensors among the five sensors.

The data recording unit 12 includes a hard disk (not illustrated) and a recording head (not illustrated). The hard disk serves as an external storage device and a recording medium, and the recording head serves as a driver for reading, for example, a map information database (DB) 31, a guidance phrase condition table 32, and predetermined programs recorded in the hard disk and for writing predetermined data into the hard disk. The data recording unit 12 may include optical disks such as memory cards, CDs, and DVDs instead of the hard disk.

The map information DB 31 is a storage unit that stores, for example, link data 33 relating to roads (links), node data 34 relating to nodes, junction data 35 relating to junctions, point data relating to points such as facilities, map display data for displaying maps, route search data for searching for routes, and point search data for searching for points.

The link data 33 includes, for example, link IDs used to identify the links, end node information used to determine nodes located at the ends of the links, and the types and the numbers of traffic lanes of the roads that constitute the links. The node data 34 includes, for example, node IDs used to identify the nodes, the positional coordinates of the nodes, and target node information used to determine target nodes to which the nodes are connected via the links. The junction data 35 includes, for example, relevant node information used to determine nodes that form junctions (intersections), connected link information used to determine links connected to the junctions (herein after referred to as "connected links"), and traffic light information 36 relating to traffic lights installed near the junctions.

The traffic light information 36 includes, for each of the traffic lights installed near junctions (intersections) in the country, information such as the orientation of the traffic light (that is, the direction in which the traffic light faces; hereinafter referred to as "installation orientation"), the number of lights (three-light type, one-light type, and the like), and the positional coordinates of the traffic light (hereinafter referred to as "installation coordinates"). In cases where a plurality of traffic lights are installed near one junction, the installation orientation and the installation coordinates are stored in the traffic light information 36 for each of the plurality of traffic lights. For example, as illustrated in FIG. 2, eight traffic lights 52 to 59 are installed at a junction 51 at which roads, each having two traffic lanes on each side, intersect with each other. In this case, the traffic light information 36 relating to the junction 51 includes the installation orientations, the installation coordinates, and the like of the traffic lights 52 to 59.

The traffic light information 36 may include only information relating to a traffic light nearest to an exit side of the junction for each exit direction, that is, the last traffic light visible to the user when the vehicle passes through the junction (hereinafter referred to as an "exit-side traffic light"). For example, at the junction 51 illustrated in FIG. 2, the traffic light information 36 includes information relating to the traffic light 53 serving as the exit-side traffic light when the vehicle travels in an exit direction from bottom to top in FIG. 2, information relating to the traffic light 55 serving as the exit-side traffic light when the vehicle travels in an exit direction from top to bottom in FIG. 2, information relating to the traffic light 57 serving as the exit-side traffic light when the vehicle travels in an exit direction from left to right in FIG. 2, and information relating to the traffic light 59 serving as the exit-side traffic light when the vehicle travels in an exit direction from right to left in FIG. 2. That is, the traffic light information 36 may include only the installation orientations and the installation coordinates of the traffic lights 53, 55, 57, and 59 among the eight traffic lights 52 to 59. Alternatively, the traffic light information 36 may include only information relating to a traffic light nearest to an access side of the junction (in other words, a departure place side) for each access direction, that is, the first traffic light visible to the user when the vehicle enters the junction (hereinafter referred to as an "access-side traffic light"). Information relating to stop lines may be stored instead of traffic lights.

The navigation ECU 13 specifies a guidance junction that is located in front of the vehicle in the direction of travel and junctions that are located closer to a departure place of a navigation route than the guidance junction (hereinafter referred to as "preceding junctions") based on the data stored in the map information DB 31 as described below. The navigation ECU 13 also acquires the traffic light information 36 relating to traffic lights near the guidance junction and the preceding junctions. The navigation ECU 13 then selects guidance on the guidance junction in front of the vehicle in the direction of travel from a plurality of guidance candidates on the basis of information relating to the specified guidance junction and the preceding junctions and the acquired traffic light information 36, and sets the guidance. The guidance junction herein refers to a junction at which the user is instructed to, for example, turn right or left while the navigation system 1 provides travel guidance according to the navigation route set in the navigation system 1.

The guidance phrase condition table 32 includes, for multiple types of guidance candidates for providing guidance on the guidance junction, details of a phrase to be output by voice, time required to output the phrase, a guidance start section in which output of the phrase needs to be started (that is, the guidance needs to be started while the vehicle is in this section), a guidance end section in which the output of the phrase needs to be finished (that is, the guidance needs to be finished while the vehicle is in this section), and the like associated with each other. In the navigation system 1 according to this embodiment, the guidance start sections and the guidance end sections are determined from the position of the vehicle relative to the guidance junction and the preceding junctions, more specifically, from the position of the vehicle relative to the traffic lights installed at the guidance junction and the preceding junctions as described below.

Figure 4:
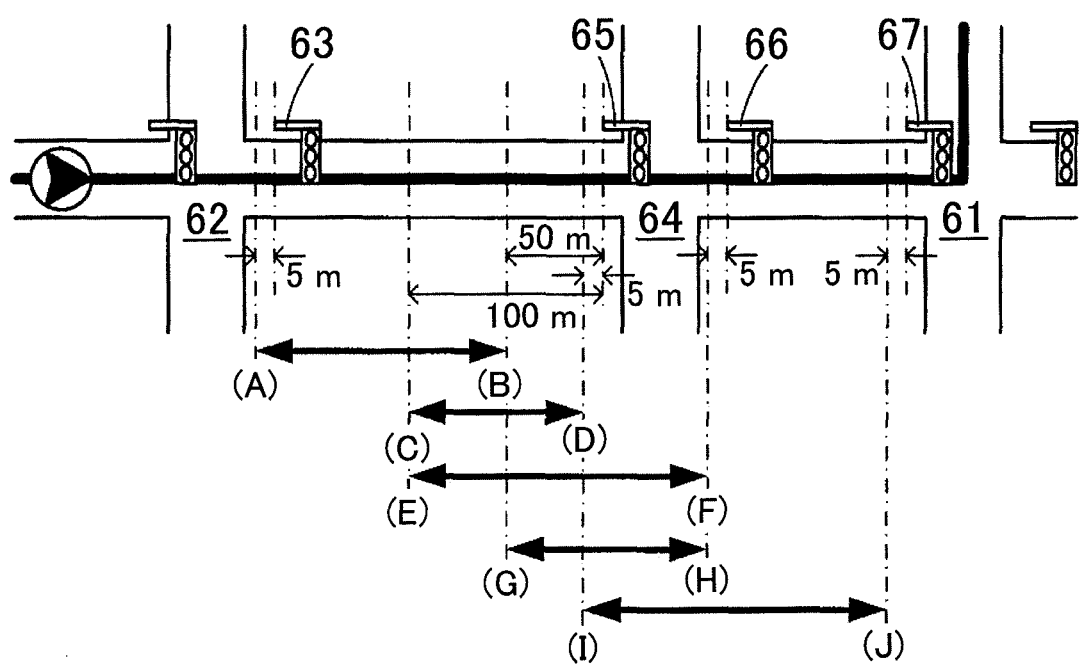
FIG. 4 illustrates guidance start sections and guidance end sections defined by the guidance phrase condition table.

The guidance phrase condition table 32 will now be described in more detail with a specific example. FIGS. 3A to 3C illustrate an example guidance phrase condition table 32. FIG. 4 illustrates the guidance start sections and the guidance end sections defined by the guidance phrase condition table 32 illustrated in FIGS. 3A to 3C. FIGS. 3A to 3C illustrate candidates for guidance to be output, among the guidance instructions on a guidance junction, when the user is instructed to turn right or left at the guidance junction with expressions using, in particular, traffic lights at junctions. In the following example, traffic lights are installed at both the guidance junction and the preceding junctions. The junction next to the guidance junction on the near side (on the departure place side along the navigation route) is referred to as a first preceding junction, the junction next to the first preceding junction on the near side (on the departure place side along the navigation route) is referred to as a second preceding junction, and the junction next to the second preceding junction on the near side (on the departure place side along the navigation route) is referred to as a third preceding junction.

In the navigation system 1 according to this embodiment, the guidance candidates set as candidates for guidance on the guidance junction are basically classified into three types in accordance with the details of the phrases for specifying the preceding junctions. Specifically, the guidance candidates are classified into "ordinary phrase", "special phrase A", and "special phrase B". The "ordinary phrase" includes a third phrase indicating the positional relationship between the vehicle and the guidance junction, and the "special phrase A" and "special phrase B" each include both a first phrase for specifying the positional relationships between the vehicle and the preceding junctions and a second phrase for specifying the positional relationship between the vehicle and the guidance junction after the vehicle has passed through the preceding junction nearest to the vehicle.

The third phrase included in the "ordinary phrase" indicates the positional relationship between the vehicle and the guidance junction using the number of junctions (more specifically, junctions at which traffic lights are installed) existing between the guidance junction and the vehicle when the guidance is provided. The phrase may include, for example, "second traffic light".

The first phrase included in the "special phrase A" indicates that, among the preceding junctions, the preceding junction nearest to the vehicle when the guidance is provided is the junction through which the vehicle is about to pass, thereby specifying the positional relationships between the vehicle and the preceding junctions. The phrase may include, for example, "the traffic light directly ahead". The second phrase included in the "special phrase A" indicates the positional relationship between the vehicle and the guidance junction after the vehicle has passed through the preceding junction using the number of junctions (more specifically, junctions at which traffic lights are installed) existing between the guidance junction and the vehicle after the vehicle has passed through the preceding junction. The phrase may include, for example, "second traffic light".

The first phrase included in the "special phrase B" indicates that, among the preceding junctions, the preceding junction nearest to the vehicle when the guidance is provided is the junction through which the vehicle is passing, thereby specifying the positional relationships between the vehicle and the preceding junctions. The phrase may include, for example, "the current traffic light". The second phrase included in the "special phrase B" indicates the positional relationship between the vehicle and the guidance junction after the vehicle has passed through the preceding junction using the number of junctions (more specifically, junctions at which traffic lights are installed) existing between the guidance junction and the vehicle after the vehicle has passed through the preceding junction. The phrase may include, for example, "next traffic light".

For example, in cases where guidance such as "turn left (right) at the second traffic light" is provided from the "ordinary phrase", output of the guidance needs to be started and finished (that is, output of voice guidance needs to be started and finished) while the user can count two traffic lights provided at junctions before the vehicle enters the guidance junction. Therefore, as illustrated in FIGS. 3A to 3C, the guidance candidate such as "turn left (right) at the second traffic light" is associated with the guidance start section between "a point 5 meters short of an exit-side traffic light at the second preceding junction" and "a point 50 meters short of an access-side traffic light at the first preceding junction", that is, a section between a point where a traffic light located at the second junction from an access-side traffic light at the guidance junction on the near side of the guidance junction becomes invisible to the user and a point where the user can have enough time to visually identify a traffic light located at the first junction from the access-side traffic light at the guidance junction on the near side of the guidance junction. The guidance candidate is also associated with the guidance end section similar to the guidance start section. Specifically, with reference to FIG. 4, the guidance start section and the guidance end section correspond to a section between a point A 5 meters short of an exit-side traffic light 63 at a second preceding junction 62 which is the second junction from a guidance junction 61 on the near side of the guidance junction 61 and a point B 50 meters short of an access-side traffic light 65 at a first preceding junction 64 which is the first junction from the guidance junction 61 on the near side of the guidance junction 61. As a result, the user provided with the guidance can count the two junctions, the first preceding junction 64 and the guidance junction 61 at which traffic lights are installed, before the vehicle enters the guidance junction 61, and can clearly identify that the "second traffic light" in the guidance phrase corresponds to an access-side traffic light 67 installed at the guidance junction 61.

Herein, the number of traffic lights in the guidance phrase is desirably the number of traffic lights in units of junctions. That is, in cases where a plurality of traffic lights are installed at the same junction of, for example, a large road, the plurality of traffic lights are desirably counted as one. In this case, the number of traffic lights in the guidance phrase corresponds to that of the junctions at which the traffic lights are installed (that is, intersections with the traffic lights). However, it is desirable that traffic lights (for example, push-button traffic lights) installed at positions other than junctions be also counted in cases where the number of traffic lights is counted in units of junctions. The same applies to the following description.

For example, in cases where guidance such as "turn left (right) at the next traffic light following the traffic light directly ahead" is provided from the "special phrase A", output of the guidance needs to be started and finished (that is, output of voice guidance needs to be started and finished) while the user can determine that the vehicle is about to pass through the junction (the junction at which the traffic light, indicated by the description "the traffic light directly ahead" in the guidance phrase, is installed) which is the first junction from the guidance junction on the near side of the guidance junction. Therefore, as illustrated in FIGS. 3A to 3C, the guidance candidate such as "turn left (right) at the next traffic light following the traffic light directly ahead" is associated with the guidance start section between "a point 100 meters short of the access-side traffic light at the first preceding junction or a point 5 meters short of the exit-side traffic light at the second preceding junction whichever is closer to the guidance junction" and "a point meters short of the access-side traffic light at the first preceding junction" (that is, a section where the traffic light installed at the first junction from the access-side traffic light at the guidance junction on the near side of the guidance junction is closest to the vehicle and where the user can visually identify the traffic light). The guidance candidate is also associated with the guidance end section between "a point 100 meters short of the access-side traffic light at the first preceding junction or a point 5 meters short of the exit-side traffic light at the second preceding junction whichever is closer to the guidance junction" and "a point 5 meters short of an exit-side traffic light at the first preceding junction" (that is, a section where the traffic light installed at the first junction from the access-side traffic light at the guidance junction on the near side of the guidance junction is closest to the vehicle and where the user can determine that the vehicle has not passed (that is, during passing or before passing) through the junction). Specifically, with reference to FIG. 4, the guidance start section corresponds to a section between a point C 100 meters short of the access-side traffic light 65 at the first preceding junction 64 which is the first junction from the guidance junction 61 on the near side of the guidance junction 61 and a point D 5 meters short of the access-side traffic light 65 at the first preceding junction 64. In addition, the guidance end section corresponds to a section between a point E 100 meters short of the access-side traffic light 65 at the first preceding junction 64 which is the first junction from the guidance junction 61 on the near side of the guidance junction 61 and a point F 5 meters short of an exit-side traffic light 66 at the first preceding junction 64. As a result, the user provided with the guidance can understand that the first preceding junction 64 corresponds to the junction at which the traffic light, indicated by the description "the traffic light directly ahead" in the guidance phrase, is installed, and can clearly identify that the "next traffic light" in the guidance phrase corresponds to the access-side traffic light 67 at the guidance junction 61.

For example, in cases where guidance such as "turn left (right) at the next traffic light following the current traffic light" is provided from the "special phrase B", output of the guidance needs to be started and finished (that is, output of voice guidance needs to be started and finished) while the user can determine that the vehicle is passing through the traffic light at the junction (the junction at which the traffic light, indicated by the description "the current traffic light" in the guidance phrase, is installed) which is the first junction from the guidance junction on the near side of the guidance junction. Therefore, as illustrated in FIGS. 3A to 3C, the guidance candidate such as "turn left (right) at the next traffic light following the current traffic light" is associated with the guidance start section between "a point 50 meters short of the access-side traffic light at the first preceding junction or a point 5 meters short of the exit-side traffic light at the second preceding junction whichever is closer to the guidance junction" and "a point 5 meters short of the exit-side traffic light at the first preceding junction" (that is, a section where the traffic light installed at the first junction from the access-side traffic light at the guidance junction on the near side of the guidance junction is closest to the vehicle and where the user can visually identify the traffic light). The guidance candidate is also associated with the guidance end section between "a point 5 meters short of the access-side traffic light at the first preceding junction" and "a point 5 meters short of an access-side traffic light at the guidance junction" (that is, a section where the traffic light installed at the first junction from the access-side traffic light at the guidance junction on the near side of the guidance junction is closest to the vehicle and where the user can determine that the vehicle is passing through the junction at the moment). Specifically, with reference to FIG. 4, the guidance start section corresponds to a section between a point G 50 meters short of the access-side traffic light 65 at the first preceding junction 64, which is the first junction with traffic lights from the guidance junction 61 on the near side of the guidance junction 61 and a point H 5 meters short of the exit-side traffic light 66 at the first preceding junction 64. In addition, the guidance end section corresponds to a section between a point I 5 meters short of the access-side traffic light 65 at the first preceding junction 64, which is the first junction with traffic lights from the guidance junction 61 on the near side of the guidance junction 61 and a point J 5 meters short of the access-side traffic light 67 at the guidance junction 61. As a result, the user provided with the guidance can understand that the first preceding junction 64 corresponds to the junction at which the traffic light, indicated by the description "the current traffic light" in the guidance phrase, is installed, and can clearly identify that the "next traffic light" in the guidance phrase corresponds to the access-side traffic light 67 at the guidance junction 61.

The guidance phrase condition table 32 similarly includes other guidance candidates. Navigation directions at the guidance junction may include, for example, diagonally right (left) and nearer right (left) in addition to left and right. In addition, time required to output the guidance varies in accordance with the navigation directions. Numerical values for determining the start edge and the end edge of each guidance start section and those of each guidance end section (for example, 5 meters, 50 meters, and 100 meters) can be changed as appropriate. For example, although a point 5 meters short of each traffic light is defined as a point where the traffic light becomes invisible to the user, the value can be changed in accordance with the type of the vehicle.

The navigation ECU 13 selects guidance on the guidance junction in front of the vehicle in the direction of travel from the "ordinary phrase", the "special phrase A", and the "special phrase B" on the basis of, for example, the shape of the navigation route, positional information relating to junctions and traffic lights installed on the navigation route, and the guidance phrase condition table 32 as described below, and sets the guidance. For example, the above-described guidance candidates in the "ordinary phrase", the "special phrase A", and the "special phrase B" used for the guidance on the guidance junction each include one or more phrases among the first to third phrases for specifying the positional relationships between the vehicle and the preceding junctions and the positional relationship between the vehicle and the guidance junction, and the details thereof differ from each other. Therefore, the navigation ECU 13 sets guidance candidates including phrases appropriately indicating the positional relationships between the vehicle and the preceding junctions and the positional relationship between the vehicle and the guidance junction for the guidance on the guidance junction in view of the positional relationships between the vehicle and the preceding junctions and the positional relationship between the vehicle and the guidance junction as described below.

The navigation ECU 13 controls the entire navigation system 1. The navigation ECU 13 includes a CPU 41 and internal storage devices. The CPU 41 serves as a computing device and a control device. The internal storage devices include, for example, a RAM 42 that serves as a working memory used when the CPU 41 performs various computations and that stores data such as route data obtained when routes are searched for; a ROM 43 in which programs for control, a junction guiding program (described below; see FIGS. 5 to 7, 9, and 11), and other programs are recorded; and a flash memory 44 that stores the programs read from the ROM 43. Herein, the navigation ECU 13 configures various units serving as processing algorithms. For example, a navigation-route setting unit sets a navigation route from a departure place, for example, the current position of the vehicle (movable body), to a destination and a guidance junction to guide traveling of the vehicle. A junction acquiring unit acquires the positions of preceding junctions that are located closer to the departure place of the navigation route than the guidance junction. A guidance setting unit sets guidance on the guidance junction, and a junction guiding unit provides the guidance on the guidance junction on the basis of the guidance set by the guidance setting unit. A junction-number acquiring unit acquires the number of junctions existing between each of the preceding junctions and the guidance junction.

The operating unit 14 includes operating switches (not illustrated) such as various keys and buttons, and is operated when, for example, the user inputs a departure place serving as a travel starting point and a destination serving as a travel end point. The navigation ECU 13 performs control to execute various operations corresponding to switching signals output, for example, when the switches are pushed down. The operating unit 14 may include a touch panel disposed on the front surface of the liquid crystal display 15. In addition, the operating unit 14 may include a microphone and a voice recognition device.

The liquid crystal display 15 displays, for example, map images including roads, traffic information, operation guidance, operation menus, key guidance, a navigation route from the departure place to the destination, guidance along the navigation route, news, weather forecasts, time, email messages, and television programs. In particular, in this embodiment, when the vehicle reaches such a point that the guidance junction is located within a predetermined distance (for example, 300 meters) ahead of the vehicle in the direction of travel, the liquid crystal display 15 displays an enlarged view in the vicinity of the guidance junction and the direction of travel of the vehicle at the guidance junction.

The speaker 16 outputs guidance such as traffic information and voice guidance used to guide the driver along the navigation route on the basis of instructions issued from the navigation ECU 13. In particular, in this embodiment, in cases where the guidance junction exists in front of the vehicle in the direction of travel, the speaker 16 outputs voice guidance on the guidance junction at a predetermined guidance starting timing based on the details of the guidance. For example, voice guidance such as "turn left at the second traffic light" is output when the vehicle reaches a point 5 meters short of the exit-side traffic light at the second preceding junction (see FIGS. 3A to 3C).

The DVD drive 17 can read data recorded in recording media such as DVDs and CDs. For example, reproduction of music and video and update of the map information DB 31 are carried out on the basis of the data read by the DVD drive 17.

The communication module 18 is a communication device that receives traffic information including congestion information, restriction information, and traffic accident information transmitted from traffic information centers such as the VICS center and probe centers. The communication module 18 corresponds to, for example, a cellular phone or a data communication module (DCM).

Figure 5:
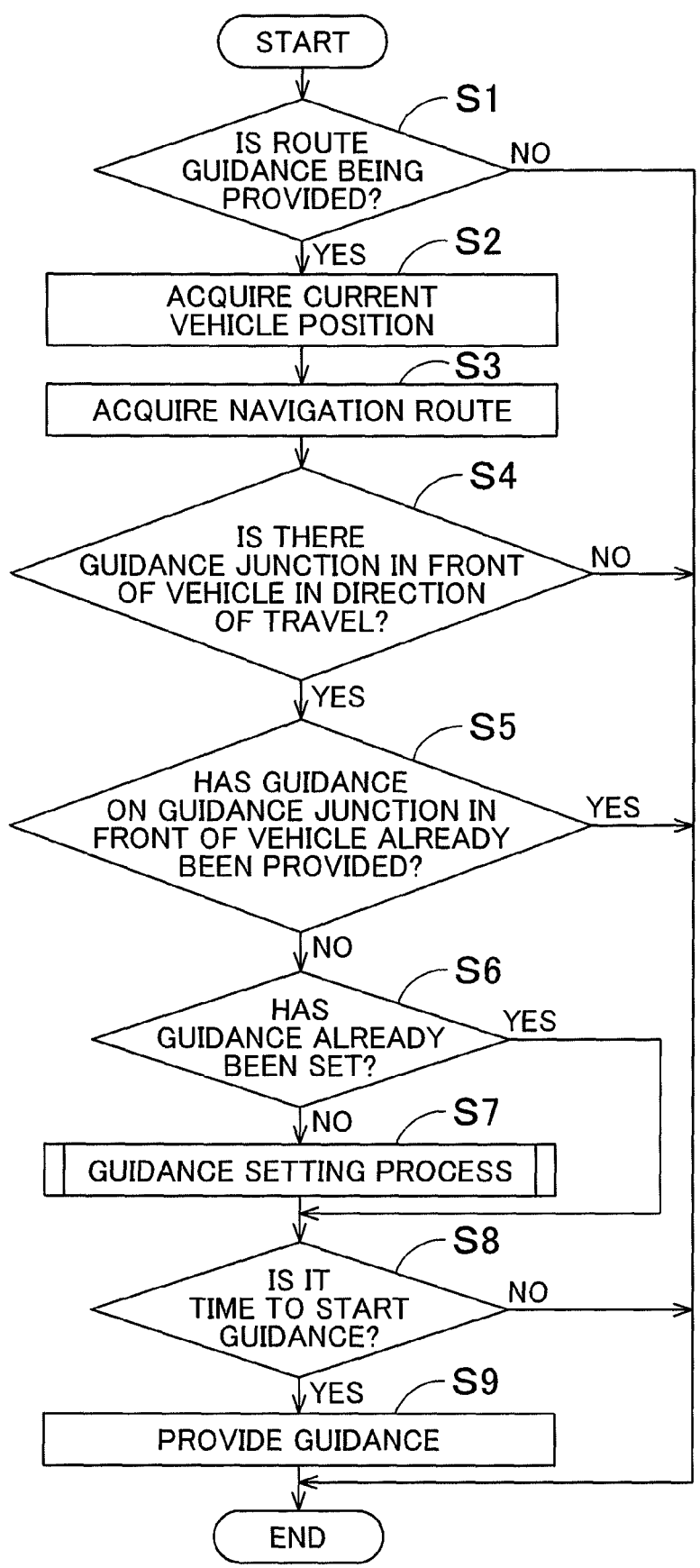
FIG. 5 is a flow chart of a junction guiding program according to the embodiment.

The junction guiding program executed by the navigation ECU 13 in the navigation system 1 having the above-described configuration will now be described with reference to FIG. 5. FIG. 5 is a flow chart of the junction guiding program according to this embodiment. Herein, the junction guiding program is a program to provide guidance on the guidance junction on the navigation route, and is repeatedly executed at predetermined intervals (for example, each time the current position of the vehicle is detected) after the accessory (ACC) power of the vehicle is turned on. The program illustrated in the flow charts in FIGS. 5 to 7, 9, and 11 are stored in, for example, the RAM 42 or the ROM 43 included in the navigation system 1, and executed by the CPU 41.

In Step 1 of the junction guiding program, the CPU 41 determines whether or not route guidance based on a navigation route set in the navigation system 1 is being provided. In the following description, "Step" is abbreviated as "S". The navigation route is a recommended route from a departure place (for example, the current position of the vehicle) to a destination selected by the user, and is set on the basis of route search results. Route search is performed on the basis of, for example, well-known Dijkstra's algorithm using information such as the link data 33 and the node data 34 stored in the map information DB 31 and traffic information acquired from the VICS center.

If it is determined that route guidance based on the navigation route set in the navigation system 1 is being provided (Yes in S1), the process proceeds to S2. If it is determined that route guidance based on the navigation route set in the navigation system 1 is not being provided (No in S1), the junction guiding program is ended.

In S2, the CPU 41 acquires the current position of the vehicle from results obtained by the current-position detecting unit 11. The CPU 41 also performs map matching in which the current position of the vehicle on map data is determined. It is desirable that the current position of the vehicle be accurately determined using a high-precision location technology. The high-precision location technology herein enables detection of cruising lanes and the highly accurate position of the vehicle by detecting information relating to white lines and road surface paintings captured by a camera attached to the rear of the vehicle using image recognition and by comparing the information with the map information DB in which information relating to white lines and road surface paintings is stored in advance. Details of the high-precision location technology are omitted since it is already in the public domain.

In S3, the CPU 41 acquires the navigation route (including a guidance junction on the navigation route) set in the navigation system 1.

In S4, the CPU 41 determines whether or not a guidance junction exists in front of the vehicle in the direction of travel within a predetermined distance (for example, 1.47 kilometers) from the current position of the vehicle acquired in S2 and the navigation route acquired in S3. As described above, the guidance junction refers to a junction at which the user is instructed to, for example, turn left or right while the navigation system 1 provides travel guidance according to the navigation route set in the navigation system 1.

If it is determined that a guidance junction exists in front of the vehicle in the direction of travel within a predetermined distance (Yes in S4), the process proceeds to S5. If it is determined that no guidance junction exists in front of the vehicle in the direction of travel within a predetermined distance (No in S4), the junction guiding program is ended.

In S5, the CPU 41 determines whether or not guidance on the guidance junction in front of the vehicle in the direction of travel has already been provided. In particular, in S5, it is determined whether or not a voice guidance instruction to, for example, turn right or left at the guidance junction has been provided among the guidance instructions on the guidance junction.

If it is determined that the guidance on the guidance junction in front of the vehicle in the direction of travel has already been provided (Yes in S5), the junction guiding program is ended. If it is determined that the guidance on the guidance junction in front of the vehicle in the direction of travel has not been provided yet (No in S5), the process proceeds to S6.

In S6, the CPU 41 determines whether or not the guidance on the guidance junction in front of the vehicle in the direction of travel has already been set in a guidance setting process (S7). In particular, in S6, it is determined whether or not a voice guidance instruction to, for example, turn right or left at the guidance junction has been set among the guidance instructions on the guidance junction.

If it is determined that the guidance on the guidance junction in front of the vehicle in the direction of travel has already been set (Yes in S6), the process proceeds to S8. If it is determined that the guidance on the guidance junction in front of the vehicle in the direction of travel has not been set yet (No in S6), the process proceeds to S7.

Figure 6:
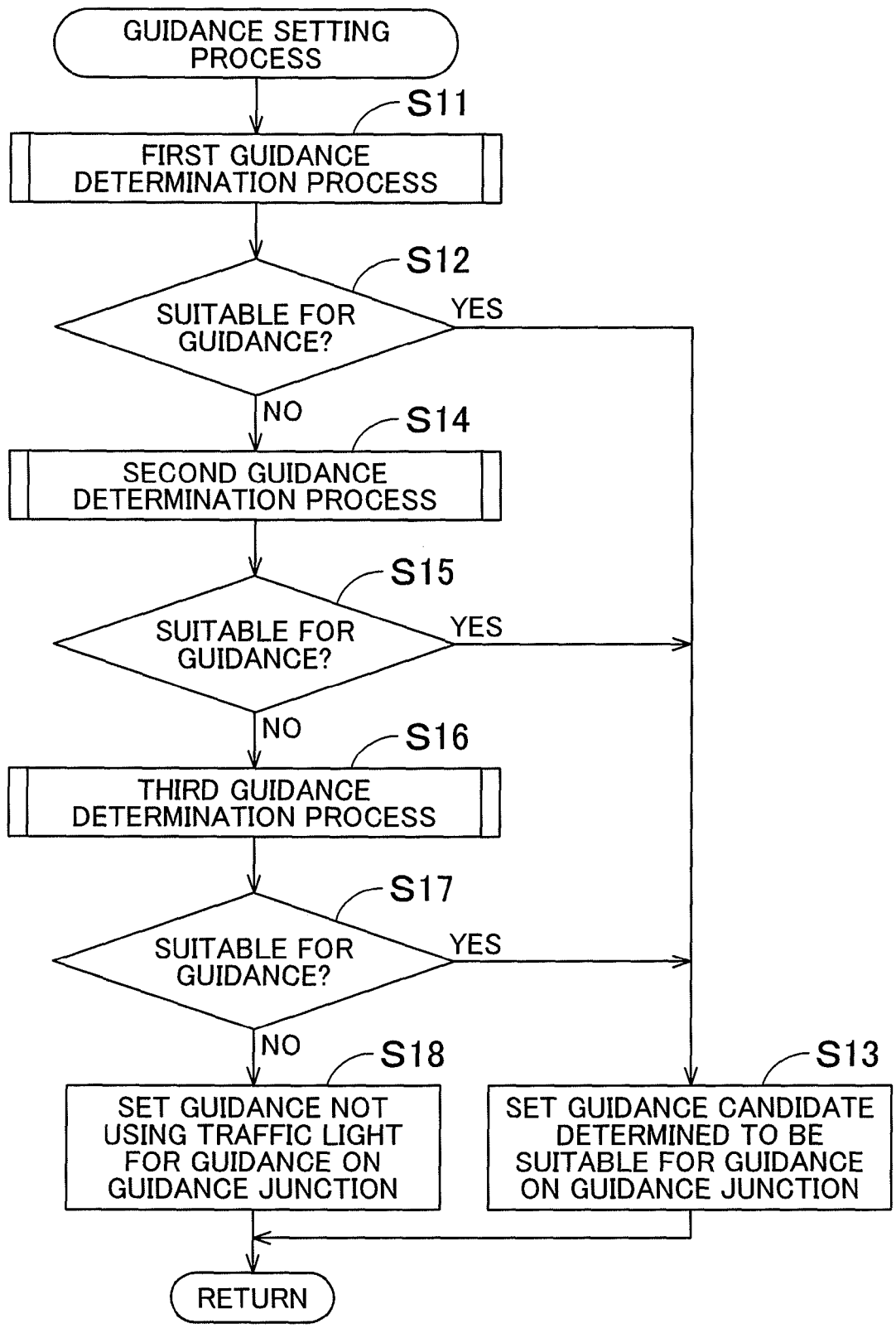
FIG. 6 is a flow chart of a sub-process program of a guidance setting process according to the embodiment.

In S7, the CPU 41 performs the guidance setting process (FIG. 6). The guidance setting process selects an optimum guidance candidate used for guidance on the guidance junction in front of the vehicle in the direction of travel from a plurality of guidance candidates (the "ordinary phrase", the "special phrase A", and the "special phrase B" of the three types in this embodiment) defined by the guidance phrase condition table 32 on the basis of the position of the vehicle relative to the preceding junctions as described below, and sets the guidance candidate for the guidance on the guidance junction.

In S8, the CPU 41 determines whether or not it is time to start the guidance based on the guidance candidate set for the guidance in S7. Specifically, the CPU 41 determines whether or not the vehicle is located in the guidance start section (see FIGS. 3A to 3C) which is associated with the guidance candidate set for the guidance in S7, and determines that it is time to start the guidance if the vehicle is located in the guidance start section. Usually, a moment when the vehicle reaches, in particular, the starting point of the guidance start section is defined as the time to start the guidance. For example, in cases where guidance using the "ordinary phrase" is set for the guidance on the guidance junction in S7, the CPU 41 determines that it is time to start the corresponding guidance when the vehicle reaches "a point 5 meters short of an exit-side traffic light at the third preceding junction", "a point 5 meters short of the exit-side traffic light at the second preceding junction", or "a point 5 meters short of the exit-side traffic light at the first preceding junction". If the guidance will be finished while the vehicle is in the corresponding guidance end section, a moment when the vehicle reaches a point other than the starting point of the guidance start section (for example, the end point or an intermediate point) may be defined as the time to start the guidance. For example, with consideration of errors in detecting the current position of the vehicle, a moment when the vehicle reaches a point shifted from the starting point of the guidance start section toward the end point by a distance of the maximum possible detection error (for example, 30 meters) may be defined as the time to start the guidance. If preceding guidance is not finished when the vehicle reaches the starting point of the next guidance start section due to, for example, small intervals between the preceding junctions or guidance junctions following one after another, a moment when the preceding guidance is finished is defined as the time to start the guidance.

If it is determined that it is time to start the guidance based on the guidance candidates set for the guidance in S7 (Yes in S8), the process proceeds to S9. If it is determined that it is not time to start the guidance based on the guidance candidates set for the guidance in S7 (No in S8), the junction guiding program is ended.

In S9, the CPU 41 provides the guidance on the guidance junction on the basis of the guidance candidates set for the guidance in S7. Specifically, the CPU 41 provides guidance for specifying the guidance junction and an exit direction along which the vehicle leaves the guidance junction (that is, guidance for specifying an exit road that the vehicle enters after leaving the guidance junction). For example, in cases where the guidance using the "special phrase A" is set for the guidance on the guidance junction in S7 and the number of junctions existing between the preceding junction through which the vehicle is about to pass and the guidance junction, excluding the preceding junction and including the guidance junction, is two, a phrase such as "turn left (right) at the second traffic light following the traffic light directly ahead" is output from the speaker 16 when the vehicle is in the corresponding guidance start section. In cases where the number of junctions existing between the preceding junction through which the vehicle is about to pass and the guidance junction, excluding the preceding junction and including the guidance junction, is one, a phrase such as "turn left (right) at the next traffic light following the traffic light directly ahead" is output from the speaker 16. The number of junctions existing between the preceding junction and the guidance junction is acquired from the current position of the vehicle acquired in S2 and the map information DB 31. When the vehicle reaches such a point that the guidance junction is located within a predetermined distance (for example, 300 meters), the liquid crystal display 15 displays an enlarged view in the vicinity of the guidance junction and the direction of travel of the vehicle at the guidance junction.

This enables the user to correctly identify the guidance junction and the exit road that the vehicle enters after leaving the guidance junction.

Next, sub-processes of the guidance setting process performed in S7 will be described with reference to FIG. 6. FIG. 6 is a flow chart of a sub-process program of the guidance setting process.

First, the CPU 41 performs a first guidance determination process (FIG. 7; described below) in S11. The first guidance determination process determines whether or not the guidance using, in particular, the "ordinary phrase" among the plurality of guidance candidates defined by the guidance phrase condition table 32 (FIGS. 3A to 3C) is suitable for the guidance on the guidance junction in front of the vehicle in the direction of travel as described below. The guidance using the "ordinary phrase" includes the third phrase (for example, "second traffic light") indicating the positional relationship between the vehicle and the guidance junction using the number of junctions (more specifically, junctions at which traffic lights are installed) existing between the vehicle and the guidance junction when the guidance is provided.

In S12, the CPU 41 determines whether or not the guidance using the "ordinary phrase" is determined as suitable for the guidance on the guidance junction in front of the vehicle in the direction of travel from a result of determination in the first guidance determination process in S11.

If it is determined that the guidance using the "ordinary phrase" is suitable for the guidance on the guidance junction in front of the vehicle in the direction of travel (Yes in S12), the process proceeds to S13. If it is determined that the guidance using the "ordinary phrase" is not suitable for the guidance on the guidance junction in front of the vehicle in the direction of travel (No in S12), the process proceeds to S14.

In S13, the CPU 41 sets the guidance using the "ordinary phrase" for the guidance on the guidance junction in front of the vehicle in the direction of travel. In addition, the CPU 41 sets the time when the vehicle will be in the guidance start section associated with the guidance using the corresponding "ordinary phrase" for the time to start the guidance on the guidance junction in front of the vehicle in the direction of travel. The process then proceeds to S8.

Figure 9:
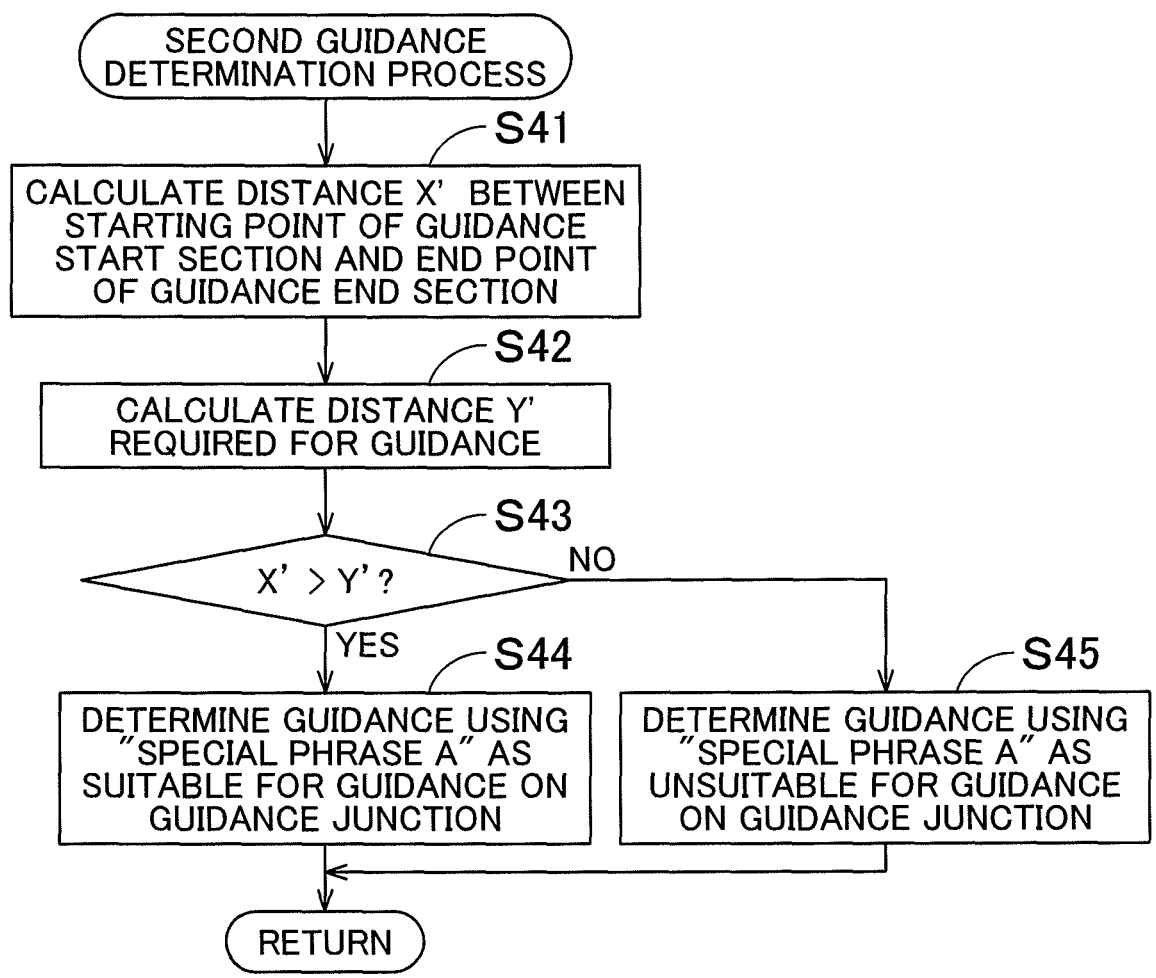
FIG. 9 is a flow chart of a sub-process program of a second guidance determination process according to the embodiment.

In S14, the CPU 41 performs a second guidance determination process (FIG. 9; described below). The second guidance determination process determines whether or not the guidance using, in particular, the "special phrase A" among the plurality of guidance candidates defined by the guidance phrase condition table 32 is suitable for the guidance on the guidance junction in front of the vehicle in the direction of travel as described below. The guidance using the "special phrase A" includes the first phrase (for example, "the traffic light directly ahead") and the second phrase (for example, "second traffic light"). The first phrase indicates that, among the preceding junctions, the preceding junction nearest to the vehicle when the guidance is provided is the junction through which the vehicle is about to pass, and thereby specifying the positional relationships between the vehicle and the preceding junctions. The second phrase indicates the positional relationship between the vehicle and the guidance junction after the vehicle has passed through the preceding junction using the number of junctions (more specifically, junctions at which traffic lights are installed) existing between the guidance junction and the vehicle after the vehicle has passed through the preceding junction.

In S15, the CPU 41 determines whether or not the guidance using the "special phrase A" is determined as suitable for the guidance on the guidance junction in front of the vehicle in the direction of travel from a result of determination in the second guidance determination process in S14.

If it is determined that the guidance using the "special phrase A" is suitable for the guidance on the guidance junction in front of the vehicle in the direction of travel (Yes in S15), the process proceeds to S13. If it is determined that the guidance using the "special phrase A" is not suitable for the guidance on the guidance junction in front of the vehicle in the direction of travel (No in S15), the process proceeds to S16.

In S13, the CPU 41 sets the guidance using the "special phrase A" for the guidance on the guidance junction in front of the vehicle in the direction of travel. In addition, the CPU 41 sets the time when the vehicle will be in the guidance start section associated with the guidance using the corresponding "special phrase A" for the time to start the guidance on the guidance junction in front of the vehicle in the direction of travel. The process then proceeds to S8.

Figure 11:
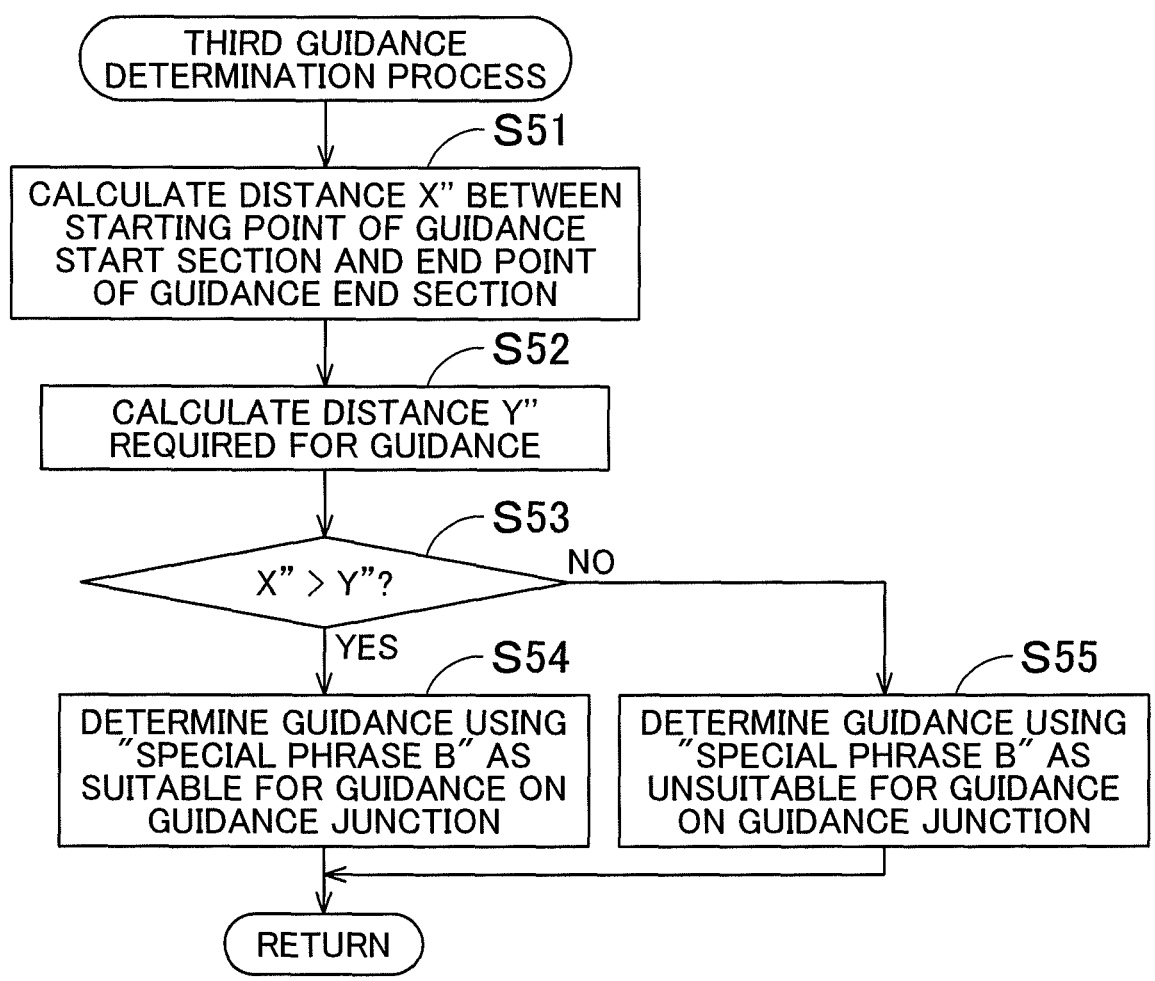
FIG. 11 is a flow chart of a sub-process program of a third guidance determination process according to the embodiment.

In S16, the CPU 41 performs a third guidance determination process (FIG. 11; described below). The third guidance determination process determines whether or not the guidance using, in particular, the "special phrase B" among the plurality of guidance candidates defined by the guidance phrase condition table 32 is suitable for the guidance on the guidance junction in front of the vehicle in the direction of travel as described below. The guidance using the "special phrase B" includes the first phrase (for example, "the current traffic light") and the second phrase (for example, "second traffic light"). The first phrase indicates that, among the preceding junctions, the preceding junction nearest to the vehicle when the guidance is provided is the junction through which the vehicle is passing, and thereby specifying the positional relationships between the vehicle and the preceding junctions. The second phrase indicates the positional relationship between the vehicle and the guidance junction after the vehicle has passed through the preceding junction using the number of junctions (more specifically, junctions at which traffic lights are installed) existing between the guidance junction and the vehicle after the vehicle has passed through the preceding junction.

In S17, the CPU 41 determines whether or not the guidance using the "special phrase B" is determined as suitable for the guidance on the guidance junction in front of the vehicle in the direction of travel from a result of determination in the third guidance determination process in S16.

If it is determined that the guidance using the "special phrase B" is suitable for the guidance on the guidance junction in front of the vehicle in the direction of travel (Yes in S17), the process proceeds to S13. If it is determined that the guidance using the "special phrase B" is not suitable for the guidance on the guidance junction in front of the vehicle in the direction of travel (No in S17), the process proceeds to S18.

In S13, the CPU 41 sets the guidance using the "special phrase B" for the guidance on the guidance junction in front of the vehicle in the direction of travel. In addition, the CPU 41 sets the time when the vehicle will be in the guidance start section associated with the guidance using the corresponding "special phrase B" for the time to start the guidance on the guidance junction in front of the vehicle in the direction of travel. The process then proceeds to S8.

In S18, the CPU 41 sets guidance not using traffic lights for the guidance on the guidance junction in front of the vehicle in the direction of travel. The guidance not using the traffic lights includes, for example, output of phrases such as "turn right (left) soon" and "turn right (left) in 300 meters (700 meters)". In addition, the time when the vehicle will be in the guidance start section associated with the set guidance (for example, the time when the vehicle will reach a point 350 meters short of the guidance junction in cases where a phrase such as "turn right (left) in 300 meters" is output) is set for the time to start the guidance on the guidance junction in front of the vehicle in the direction of travel. The process then proceeds to S8.

When the guidance start sections associated with the guidance using the "ordinary phrase" to be determined in S11, those associated with the "special phrase A" to be determined in S14, and those associated with the "special phrase B" to be determined in S16 are compared, those associated with the guidance using the "ordinary phrase" to be determined in S11 are nearest to the departure place on the navigation route, and those associated with the "special phrase B" to be determined in S16 are nearest to the guidance junction. That is, in cases where there are a plurality of guidance types that are determined to be suitable for the guidance on the guidance junction in front of the vehicle in the direction of travel, guidance candidates of the guidance type associated with the guidance start sections closer to the departure place (that is, those to be output earlier) than those of the other types are preferentially set for the guidance on the guidance junction.

Figure 7:
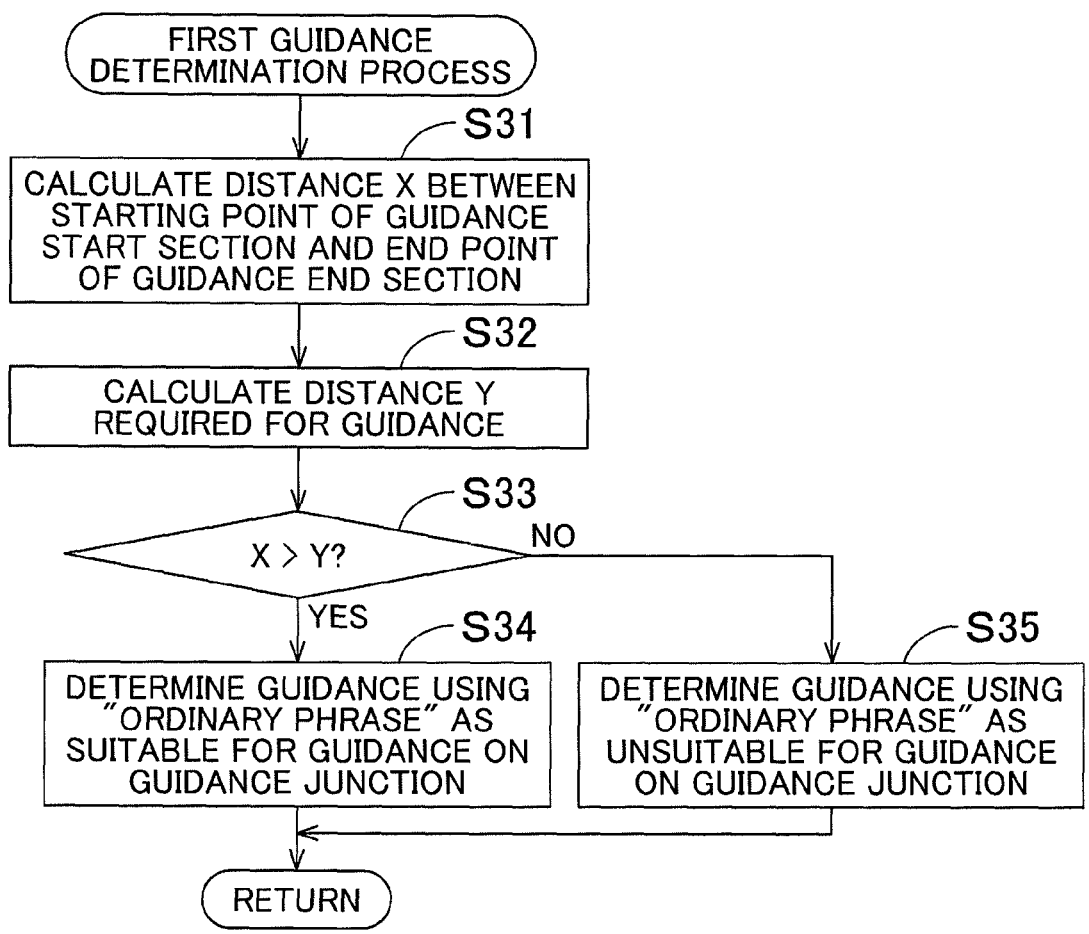
FIG. 7 is a flow chart of a sub-process program of a first guidance determination process according to the embodiment.

Next, sub-processes of the first guidance determination process performed in S11 will be described with reference to FIG. 7. FIG. 7 is a flow chart of a sub-process program of the first guidance determination process.

In S31, the CPU 41 calculates a distance X between the starting point of the guidance start section and the end point of the guidance end section associated with the guidance using the "ordinary phrase" from the link data 33, the node data 34, the junction data 35, and the like stored in the map information DB 31. Herein, as illustrated in FIGS. 3A to 3C, the guidance using the "ordinary phrase" includes three guidance phrases ("turn left (right) at the third traffic light", "turn left (right) at the second traffic light", and "turn left (right) at the next traffic light") in which the number of junctions between the vehicle and the guidance junction, indicated by the third phrase, varies. In S31, the distance X is calculated for each of the guidance phrases.

A method of calculating the distance X will now be described with reference to FIG. 8 using an example of a guidance phrase such as "turn left (right) at the second traffic light" among the guidance using the "ordinary phrase".

Figure 8:
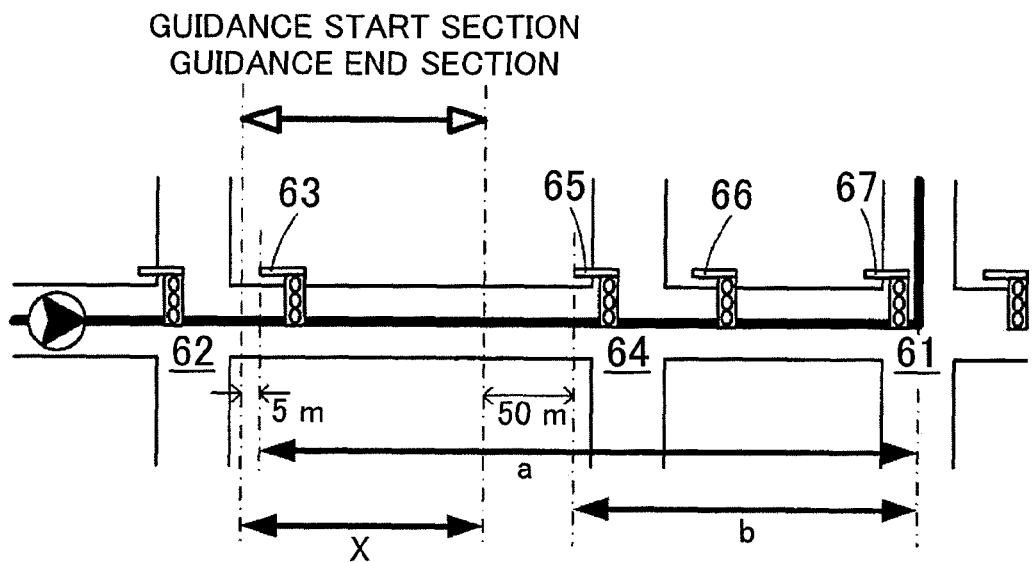
FIG. 8 illustrates a determination method in the sub-process program of the first guidance determination process.

As illustrated in FIG. 8, the CPU 41 first acquires a distance a between the guidance junction 61 and the exit-side traffic light 63 at the second preceding junction 62 which is the second junction with traffic lights from the guidance junction 61 on the near side of the guidance junction 61 based on the link data 33, the node data 34, the junction data 35, and the like stored in the map information DB 31. Next, the CPU 41 acquires a distance b between the guidance junction 61 and the access-side traffic light 65 at the first preceding junction 64 which is the first junction with traffic lights from the guidance junction 61 on the near side of the guidance junction 61. Subsequently, the CPU 41 calculates a difference between a distance obtained by adding 5 meters to the distance a and a distance obtained by adding 50 meters to the distance b as the distance X.

In S32, the CPU 41 calculates a distance Y required to provide guidance using the "ordinary phrase" from the current vehicle speed and the guidance phrase condition table 32. Specifically, the distance Y is obtained by multiplying time required to output the guidance (voice guidance) stored in the guidance phrase condition table 32 (for example, 4 seconds) by the current vehicle speed detected by the vehicle speed sensor 22. A predetermined vehicle speed (for example, 60 km/h) may be used instead of the current vehicle speed. The predetermined vehicle speed may be changed in accordance with the types of the roads on which the vehicle travels. For example, 60 km/h may be used for national roads and prefectural roads, and 40 km/h may be used for other ordinary roads. Herein, as illustrated in FIGS. 3A to 3C, the guidance using the "ordinary phrase" includes three guidance phrases ("turn left (right) at the third traffic light", "turn left (right) at the second traffic light", and "turn left (right) at the next traffic light") that are output at different times. In S32, the distance Y is calculated for each of the guidance phrases.

In S33, the CPU 41 determines whether or not the distance X between the starting point of the guidance start section and the end point of the guidance end section calculated in S31 is larger than the distance Y required to output the guidance calculated in S32, that is, whether or not the guidance can be finished in the guidance end section associated with the guidance using the "ordinary phrase" when the guidance is started in the guidance start section associated with the same guidance. Herein, as illustrated in FIGS. 3A to 3C, the guidance using the "ordinary phrase" includes three guidance phrases ("turn left (right) at the third traffic light", "turn left (right) at the second traffic light", and "turn left (right) at the next traffic light") that are output at different times. In S33, the distance X and the distance Y are compared for each of the guidance phrases. It is desirable to determine whether or not the distance X is larger than the distance Y in S33 for all the guidance phrases.

If it is determined that the distance X between the starting point of the guidance start section and the end point of the guidance end section is larger than the distance Y which is required to output the guidance (Yes in S33), that is, if it is determined that the guidance can be finished in the guidance end section associated with the guidance using the "ordinary phrase" when the guidance is started in the guidance start section associated with the guidance using the "ordinary phrase", the guidance using the "ordinary phrase" is determined as suitable for the guidance on the guidance junction in front of the vehicle in the direction of travel (S34). As a result, the CPU 41 sets the guidance using the "ordinary phrase" for the guidance on the guidance junction in front of the vehicle in the direction of travel in S13 as described above.

If it is determined that the distance X between the starting point of the guidance start section and the end point of the guidance end section is smaller than or equal to the distance Y required to output the guidance (No in S33), that is, if it is determined that the guidance cannot be finished in the guidance end section associated with the guidance using the "ordinary phrase" when the guidance is started in the guidance start section associated with the same guidance, the guidance using the "ordinary phrase" is determined as unsuitable for the guidance on the guidance junction in front of the vehicle in the direction of travel (S35). The process then proceeds to S12.

Next, sub-processes of the second guidance determination process performed in S14 will be described with reference to FIG. 9. FIG. 9 is a flow chart of a sub-process program of the second guidance determination process.

In S41, the CPU 41 calculates a distance X' between the starting point of the guidance start section and the end point of the guidance end section associated with the guidance using the "special phrase A" from the link data 33, the node data 34, the junction data 35, and the like stored in the map information DB 31. Herein, as illustrated in FIGS. 3A to 3C, the guidance using the "special phrase A" includes two guidance phrases ("turn left (right) at the second traffic light following the traffic light directly ahead" and "turn left (right) at the next traffic light following the traffic light directly ahead") in which the number of junctions between the vehicle and the guidance junction, indicated by the second phrase, varies. In S41, the distance X' is calculated for each of the guidance phrases.

A method of calculating the distance X' will now be described with reference to FIG. 10 using an example of a guidance phrase such as "turn left (right) at the next traffic light following the traffic light directly ahead" among the guidance using the "special phrase A".

Figure 10:
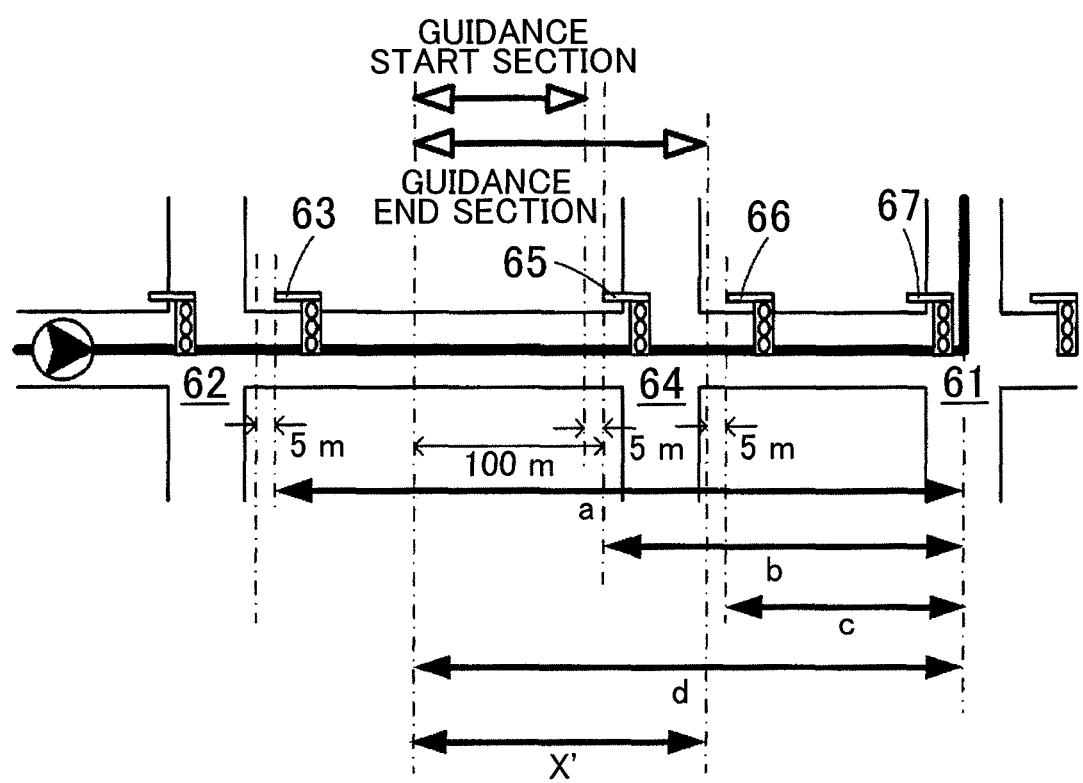
FIG. 10 illustrates a determination method in the sub-process program of the second guidance determination process.

As illustrated in FIG. 10, the CPU 41 first acquires the distance a between the guidance junction 61 and the exit-side traffic light 63 at the second preceding junction 62 which is the second junction with traffic lights from the guidance junction 61 on the near side of the guidance junction 61 based on the link data 33, the node data 34, the junction data 35, and the like stored in the map information DB 31. Next, the CPU 41 acquires the distance b between the guidance junction 61 and the access-side traffic light 65 at the first preceding junction 64 which is the first junction with traffic lights from the guidance junction 61 on the near side of the guidance junction 61. Furthermore, the CPU 41 acquires a distance c between the guidance junction 61 and the exit-side traffic light 66 at the first preceding junction 64 which is the first junction with traffic lights from the guidance junction 61 on the near side of the guidance junction 61. Subsequently, the CPU 41 determines whether or not a distance obtained by adding 100 meters to the distance b is larger than the distance obtained by adding 5 meters to the distance a. In the example illustrated in FIG. 10, the distance obtained by adding 5 meters to the distance a is larger than the distance obtained by adding 100 meters to the distance b. Therefore, "the point 100 meters short of the access-side traffic light 65 at the first preceding junction 64" is selected as the starting point of the guidance start section. Furthermore, the CPU 41 sets a distance d between the starting point of the guidance start section and the guidance junction as the distance obtained by adding 100 meters to the distance b. Subsequently, the CPU 41 calculates a difference between the distance d and a distance obtained by adding 5 meters to the distance c as the distance X'.

In S42, the CPU 41 calculates a distance Y' required to provide guidance using the "special phrase A" from the current vehicle speed and the guidance phrase condition table 32. Specifically, the distance Y' is obtained by multiplying time required to output the guidance (voice guidance) stored in the guidance phrase condition table 32 (for example, 6 seconds) by the current vehicle speed detected by the vehicle speed sensor 22. A predetermined vehicle speed (for example, 60 km/h) may be used instead of the current vehicle speed. The predetermined vehicle speed may be changed in accordance with the types of the roads on which the vehicle travels. For example, 60 km/h may be used for national roads and prefectural roads, and 40 km/h may be used for other ordinary roads. Herein, as illustrated in FIGS. 3A to 3C, the guidance using the "special phrase A" includes two guidance phrases ("turn left (right) at the second traffic light following the traffic light directly ahead" and "turn left (right) at the next traffic light following the traffic light directly ahead") that are output at different times. In S42, the distance Y' is calculated for each of the guidance phrases.

In S43, the CPU 41 determines whether or not the distance X' between the starting point of the guidance start section and the end point of the guidance end section calculated in S41 is larger than the distance Y' required to output the guidance calculated in S42, that is, whether or not the guidance can be finished in the guidance end section associated with the guidance using the "special phrase A" when the guidance is started in the guidance start sections associated with the same guidance. Herein, as illustrated in FIGS. 3A to 3C, the guidance using the "special phrase A" includes two guidance phrases ("turn left (right) at the second traffic light following the traffic light directly ahead" and "turn left (right) at the next traffic light following the traffic light directly ahead") that are output at different times. In S43, the distance X' and the distance Y' are compared for each of the guidance phrases. It is desirable to determine whether or not the distance X' is larger than the distance Y' in S43 for all the guidance phrases.

If it is determined that the distance X' between the starting point of the guidance start section and the end point of the guidance end section is larger than the distance Y' required to output the guidance (Yes in S43), that is, if it is determined that the guidance can be finished in the guidance end section associated with the guidance using the "special phrase A" when the guidance is started in the guidance start section associated with the same guidance, the guidance using the "special phrase A" is determined as suitable for the guidance on the guidance junction in front of the vehicle in the direction of travel (S44). As a result, the CPU 41 sets the guidance using the "special phrase A" for the guidance on the guidance junction in front of the vehicle in the direction of travel in S13 as described above. In the guidance using the "special phrase A", the guidance start section is set as a section through which the vehicle passes before passing through a target preceding junction cited in the guidance phrases, and the guidance end section is set so as not to extend over the target preceding junction. This enables at least part of the guidance to be output before the vehicle starts to pass through the preceding junction, and enables output of the guidance to be finished before the passage of the vehicle through the preceding junction is completed. As a result, the user can correctly identify the junction, at which traffic lights are installed, indicated by the phrase such as "the traffic light directly ahead".

If it is determined that the distance X' between the starting point of the guidance start section and the end point of the guidance end section is smaller than or equal to the distance Y' required to output the guidance (No in S43), that is, if it is determined that the guidance cannot be finished in the guidance end section associated with the guidance using the "special phrase A" when the guidance is started in the guidance start section associated with the same guidance, the guidance using the "special phrase A" is determined as unsuitable for the guidance on the guidance junction in front of the vehicle in the direction of travel (S45). The process then proceeds to S15.

Next, sub-processes of the third guidance determination process performed in S16 will be described with reference to FIG. 11. FIG. 11 is a flow chart of a sub-process program of the third guidance determination process.

In S51, the CPU 41 calculates a distance X" between the starting point of the guidance start section and the end point of the guidance end section associated with the guidance using the "special phrase B" from the link data 33, the node data 34, the junction data 35, and the like stored in the map information DB 31. Herein, as illustrated in FIGS. 3A to 3C, the guidance using the "special phrase B" includes two guidance phrases ("turn left (right) at the second traffic light following the current traffic light" and "turn left (right) at the next traffic light following the current traffic light") in which the number of junctions between the vehicle and the guidance junction, indicated by the second phrase, varies. In S51, the distance X" is calculated for each of the guidance phrases.

A method of calculating the distance X" will now be described with reference to FIG. 12 using an example of a guidance phrase such as "turn left (right) at the next traffic light following the current traffic light" among the guidance using the "special phrase B".

Figure 12:
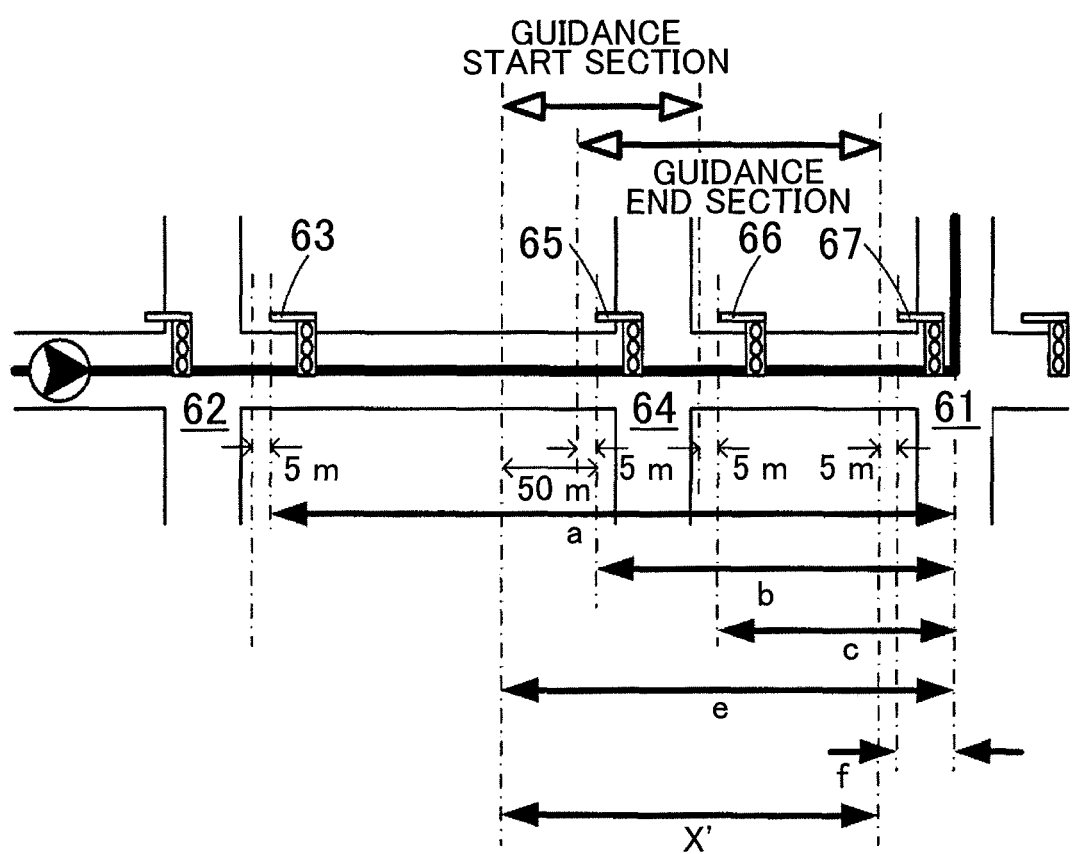
FIG. 12 illustrates a determination method in the sub-process program of the third guidance determination process.

As illustrated in FIG. 12, the CPU 41 first acquires the distance a between the guidance junction 61 and the exit-side traffic light 63 at the second preceding junction 62 which is the second junction with traffic lights from the guidance junction 61 on the near side of the guidance junction 61 based on the link data 33, the node data 34, the junction data 35, and the like stored in the map information DB 31. Next, the CPU 41 acquires the distance b between the guidance junction 61 and the access-side traffic light 65 at the first preceding junction 64 which is the first junction with traffic lights from the guidance junction 61 on the near side of the guidance junction 61. Furthermore, the CPU 41 acquires the distance c between the guidance junction 61 and the exit-side traffic light 66 at the first preceding junction 64 which is the first junction with traffic lights from the guidance junction 61 on the near side of the guidance junction 61. Subsequently, the CPU 41 determines whether or not the distance obtained by adding 50 meters to the distance b is larger than the distance obtained by adding 5 meters to the distance a. In the example illustrated in FIG. 12, the distance obtained by adding 5 meters to the distance a is larger than the distance obtained by adding 50 meters to the distance b. Therefore, "a point 50 meters short of the access-side traffic light 65 at the first preceding junction 64" is selected as the starting point of the guidance start section. Furthermore, the CPU 41 sets a distance e between the starting point of the guidance start section and the guidance junction as the distance obtained by adding 50 meters to the distance b. Meanwhile, the CPU 41 acquires a distance f between the guidance junction 61 and the access-side traffic light 67 at the guidance junction 61. Subsequently, the CPU 41 calculates a difference between the distance e and a distance obtained by adding 5 meters to the distance f as the distance X".

In S52, the CPU 41 calculates a distance Y" required to provide guidance using the "special phrase B" from the current vehicle speed and the guidance phrase condition table 32. Specifically, the distance Y" is obtained by multiplying time required to output the guidance (voice guidance) stored in the guidance phrase condition table 32 (for example, 5 seconds) by the current vehicle speed detected by the vehicle speed sensor 22. A predetermined vehicle speed (for example, 60 km/h) may be used instead of the current vehicle speed. The predetermined vehicle speed may be changed in accordance with the types of the roads on which the vehicle travels. For example, 60 km/h may be used for national roads and prefectural roads, and 40 km/h may be used for other ordinary roads. Herein, as illustrated in FIGS. 3A to 3C, the guidance using the "special phrase B" includes two guidance phrases ("turn left (right) at the second traffic light following the current traffic light" and "turn left (right) at the next traffic light following the current traffic light") that are output at different times. In S52, the distance Y" is calculated for each of the guidance phrases.

In S53, the CPU 41 determines whether or not the distance X" between the starting point of the guidance start section and the end point of the guidance end section calculated in S51 is larger than the distance Y" required to output the guidance calculated in S52, that is, whether or not the guidance can be finished in the guidance end section associated with the guidance using the "special phrase B" when the guidance is started in the guidance start sections associated with the same guidance. Herein, as illustrated in FIGS. 3A to 3C, the guidance using the "special phrase B" includes two guidance phrases ("turn left (right) at the second traffic light following the current traffic light" and "turn left (right) at the next traffic light following the current traffic light") that are output at different times. In S53, the distance X" and the distance Y" are compared for each of the guidance phrases. It is desirable to determine whether or not the distance X" is larger than the distance Y" in S53 for all the guidance phrases.

If it is determined that the distance X" between the starting point of the guidance start section and the end point of the guidance end section is larger than the distance Y" required to output the guidance (Yes in S53), that is, if it is determined that the guidance can be finished in the guidance end section associated with the guidance using the "special phrase B" when the guidance is started in the guidance start section associated with the same guidance, the guidance using the "special phrase B" is determined as suitable for the guidance on the guidance junction in front of the vehicle in the direction of travel (S54). As a result, the CPU 41 sets the guidance using the "special phrase B" for the guidance on the guidance junction in front of the vehicle in the direction of travel in S13 as described above. In the guidance using the "special phrase B", at least part of the guidance is output while the vehicle travels within the preceding junction which is a section where the guidance start section and the guidance end section overlap with each other. This enables the user to correctly identify the junction, at which traffic lights are installed, indicated by the phrase such as "the current traffic light".

If it is determined that the distance X" between the starting point of the guidance start section and the end point of the guidance end section is smaller than or equal to the distance Y" required to output the guidance (No in S53), that is, if it is determined that the guidance cannot be finished in the guidance end section associated with the guidance using the "special phrase B" when the guidance is started in the guidance start section associated with the same guidance, the guidance using the "special phrase B" is determined as unsuitable for the guidance on the guidance junction in front of the vehicle in the direction of travel (S55). The process then proceeds to S17. As a result, an optimum guidance candidate used for the guidance on the guidance junction in front of the vehicle in the direction of travel is selected from the plurality of guidance candidates defined by the guidance phrase condition table 32, and is set for the guidance on the guidance junction. In the above-described example, in particular, a guidance candidate including a phrase appropriately indicating the preceding junction is set for the guidance on the guidance junction.

As described above, in the junction guiding program (FIGS. 5 to 7, 9, and 11), the "ordinary phrase" is basically set for the guidance on the guidance junction, and the "special phrase A" or the "special phrase B" is set for the guidance on the guidance junction in cases where the intervals between the preceding junctions are small and where the user would misidentify the guidance junction if the "ordinary phrase" is used, more specifically, in cases where the guidance will not be finished before the vehicle reaches a point a predetermined distance short of the preceding junction (for example, 50 meters short of the access-side traffic lights). The "special phrase A" or the "special phrase B" is set for the guidance on the guidance junction with consideration of the relative positional relationships between the preceding junctions. In particular, in cases where the vehicle does not start to pass through the preceding junction nearest to the vehicle when the guidance on the guidance junction is started and where the passage of the vehicle through the preceding junction will not be completed (that is, the vehicle is about to pass or is passing through the preceding junction) while the guidance is provided, the "special phrase A" is set for the guidance on the guidance junction. In cases where the vehicle does not start to pass through the preceding junction or is passing through the preceding junction when the guidance on the guidance junction is started and where the passage of the vehicle through the preceding junction will be started or completed while the guidance is provided, the "special phrase B" is set for the guidance on the guidance junction. The "special phrase A" is set prior to the "special phrase B". As a result, in cases where the passage of the vehicle through the preceding junction will not be completed while the guidance is provided, the "special phrase A" is set for the guidance on the guidance junction. The "special phrase B" is set for the guidance on the guidance junction only in cases where the intervals between the junctions are small and where the guidance on the guidance junction will be started after the vehicle starts to pass through the preceding junction or the passage of the vehicle through the preceding junction will be completed while the guidance is provided.

In the navigation system 1, the travel guidance method using the navigation system 1, and the computer program executed by the navigation system 1 according to this embodiment described in detail above, the guidance phrase condition table 32 includes multiple types of the guidance candidates which have different phrases. The guidance candidates each are associated with the corresponding guidance start section in which output of the guidance needs to be started, and the corresponding guidance end section in which the output of the guidance needs to be ended. The guidance candidates appropriate for the guidance on the guidance junction in front of the vehicle in the direction of travel are selected from the multiple types of the guidance candidates, and the selected guidance candidates are set for the guidance on the guidance junction (S12 and S13); and when the vehicle reaches the guidance start section associated with the corresponding set guidance, the guidance on the guidance junction is provided on the basis of the set guidance (S9). In particular, the "special phrase A" and the "special phrase B" used in the guidance on the guidance junction among the multiple types of the guidance candidates include the first phrase for specifying the positional relationships between the vehicle and the preceding junctions and the second phrases for determining the positional relationship between the vehicle and the guidance junction after the vehicle has passed through the preceding junction nearest to the vehicle. This enables the user to easily identify the position of the guidance junction from the guidance provided with consideration of the passage of the vehicle through the preceding junction even when the intervals between the junctions are small. Moreover, it is possible to prevent situations in which the guidance is not provided, which have often occurred in urban areas and the like where the intervals between the junctions are small, and the user can correctly identify the guidance junction. In addition, the user can identify the guidance junction more correctly compared with the case where the user is provided with guidance using the distance to the guidance junction.

Since the first phrase is set on the basis of the relative positional relationships between the preceding junctions, the guidance on the guidance junction can be set by appropriately specifying both the positional relationships between the vehicle and the preceding junctions and the positional relationship between the vehicle and the guidance junction after the vehicle has passed through the preceding junction on the basis of the shapes of roads on the near side of the guidance junction. As a result, it is possible to reduce the load related to communication processing for acquiring information other than that relating to the shapes of the roads and the storage capacity required to store the information without performing complicated processing.

Since the number of junctions existing between the preceding junction and the guidance junction is acquired and the phrase for specifying the acquired number of junctions is set for the second phrase, the user can easily identify the positional relationship between the vehicle and the guidance junction from the number of junctions. As a result, the user can correctly identify the guidance junction.

In cases where the passage of the vehicle through the preceding junction will not be completed while the guidance on the guidance junction is provided, the guidance on the guidance junction is provided using the "special phrase A" indicating that the preceding junction is a junction through which the vehicle is about to pass. This enables the user to correctly identify the preceding junction indicated by the phrase in the guidance without confusing the preceding junction with another junction if the vehicle travels in urban areas and the like where the intervals between the junctions are small. As a result, the user can correctly identify the guidance junction.

Furthermore, in cases where the passage of the vehicle through the preceding junction will be completed while the guidance on the guidance junction is provided, the guidance on the guidance junction is provided using the "special phrase B" indicating that the vehicle is passing through the preceding junction at the moment. This enables the user to correctly identify the preceding junction indicated by the phrase in the guidance without confusing the preceding junction with another junction if the vehicle travels in urban areas and the like where the intervals between the junctions are small. As a result, the user can correctly identify the guidance junction.

The guidance on the guidance junction is started when the vehicle passes through a point determined from the position of the vehicle relative to the preceding junction. This enables the guidance on the guidance junction to be started at appropriate time based on the details of the guidance phrase. As a result, the user can correctly identify the guidance junction.

In cases where the guidance on the guidance junction will be finished before the vehicle reaches a point a predetermined distance short of the preceding junction, the guidance on the guidance junction is provided using the guidance including the third phrase indicating the positional relationship between the vehicle and the guidance junction. That is, in cases where the intervals between the junctions are large, the guidance is provided using a simple phrase without any consideration of the passage of the vehicle through the preceding junction. This enables the user to easily identify the positional relationship between the vehicle and the guidance junction.

The present invention is not limited to the above-described embodiment, and various modifications and equivalents can be made without departing from the spirit and scope of the present invention as a matter of course.

For example, although the navigation system 1 provides guidance on the guidance junction by outputting voice guidance from the speaker 16 in this embodiment, the navigation system 1 may provide guidance by displaying texts on the liquid crystal display 15.

Although the guidance start sections and the guidance end sections are determined from the positions of the access-side traffic lights and the exit-side traffic lights installed near the junctions in this embodiment, the guidance start sections and the guidance end sections may be determined from the positions of junctions (the guidance junction, the first preceding junction, and the second preceding junction). In this case, the guidance on the guidance junction may use junctions (for example, "turn left (right) at the second junction", "turn left (right) at the next junction following this junction", and "turn left (right) at the next junction following the current junction") instead of traffic lights. If the above structure that uses junctions is employed, the traffic light information 36 is unnecessary.

Although the guidance on the guidance junction in front of the vehicle in the direction of travel is set when the guidance junction exists within a predetermined distance ahead of the vehicle, the guidance on the guidance junction may be set at other times. For example, guidance on each guidance junction may be set when the navigation route including the guidance junctions is set. In addition, guidance on each junction may be set before the navigation route is set.

The numerical values (for example, 5 meters, 50 meters, and 100 meters) used in operations in the first guidance determination process (FIG. 7), the second guidance determination process (FIG. 9), and the third guidance determination process (FIG. 11) may be changed as appropriate. For example, the numerical values may be changed in accordance with the type of the vehicle.

Although the traffic light information 36 includes information relating to all the traffic lights installed near junctions in this embodiment, the traffic light information 36 may include only information relating to the traffic light nearest to the exit side of each junction for each exit direction. In this case, the present invention can be carried out by replacing the access-side traffic lights in this embodiment with the exit-side traffic lights. Furthermore, the traffic light information 36 may include only information relating to the traffic light nearest to the access side of each junction for each direction. Instead of traffic lights, information relating to stop lines may be stored. In this case, the present invention can be carried out by replacing the access-side traffic lights and the exit-side traffic lights in this embodiment with stop lines. If stop lines are used instead of traffic lights, it is desirable that the guidance be provided using the traffic lights and the junctions.

Although the three types of phrases such as the "ordinary phrase", the "special phrase A", and the "special phrase B" are used as the guidance candidates set for the guidance on the guidance junction in this embodiment, other types of guidance candidates than the above three types may be used. Although the three types of the guidance candidates including the "ordinary phrase", the "special phrase A", and the "special phrase B" are preferentially set in this order according to the order of the timing to start the guidance, the order of priority may be set on the basis of other criteria.

The present invention may also be incorporated in apparatuses having a function of providing route guidance based on navigation routes in addition to the navigation system. For example, the present invention may be incorporated in, for example, mobile terminals such as cellular phones and PDAs, personal computers, and portable music players (hereinafter referred to as "mobile terminals and the like"). The present invention may also be incorporated in systems including servers and mobile terminals and the like. In this case, either the servers or the mobile terminals and the like may perform each step of the above-described junction guiding program (see FIGS. 5 to 7, 9, and 11). In cases where the present invention is incorporated in the mobile terminals and the like, the present invention may be used to guide movable bodies other than vehicles, for example, two-wheeled vehicles and users of the mobile terminals and the like.

What is claimed is:

1. A travel guidance system comprising:
a navigation-route setting unit that sets a navigation route along which a movable body is guided and a guidance junction on the navigation route;
a junction acquiring unit that acquires a position of a preceding junction that is located closer to a departure place of the navigation route than the guidance junction;
a guidance setting unit that sets guidance on the guidance junction; and
a junction guiding unit that provides guidance on the guidance junction on the basis of the guidance set by the guidance setting unit, wherein
the guidance setting unit sets the guidance such that the guidance includes a first phrase for specifying a positional relationship between the movable body and the preceding junction, a second phrase for specifying a positional relationship between the movable body and the guidance junction after the movable body has passed through the preceding junction, and a third phrase indicating a positional relationship between the moving body and the guidance junction before passing through the preceding junction,
wherein the guidance setting unit determines whether the third phrase is suitable as guidance by determining if the third phrase can be started and finished within a predetermined timing, sets the third phrase as the guidance set, and if the third phrase is not suitable, the guidance setting sets the first phrase or the second phrase as the guidance set.

2. The travel guidance system according to claim 1, wherein
the preceding junction includes a first preceding junction and a second preceding junction located closer to the departure place of the navigation route than the first preceding junction, and
the guidance setting unit sets the first phrase on the basis of a relative positional relationship between the first preceding junction and the second preceding junction.

3. The travel guidance system according to claim 2, further comprising:
a junction-number acquiring unit that acquires a number of junctions existing between the preceding junction and the guidance junction, wherein
the guidance setting unit sets a phrase for specifying the number of junctions acquired by the junction-number acquiring unit for the second phrase.

4. The travel guidance system according to claim 3, wherein the guidance setting unit sets a phrase indicating that the preceding junction is a junction through which the movable body is about to pass for the first phrase in cases where passage of the movable body through the preceding junction will not be completed while the guidance is provided by the junction guiding unit.

5. The travel guidance system according to claim 4, wherein the guidance setting unit sets a phrase indicating that the preceding junction is a junction through which the movable body is currently passing for the first phrase in cases where passage of the movable body through the preceding junction will be completed while the guidance is provided by the junction guiding unit.

6. The travel guidance system according to claim 5, wherein the junction guiding unit starts the guidance on the guidance junction when the movable body passes through a point specified by a position of the movable body relative to the preceding junction.

7. The travel guidance system according to claim 6, wherein the guidance setting unit sets the guidance such that the guidance includes the first phrase and the second phrase in cases where the guidance provided by the junction guiding unit will not be finished before the movable body reaches a point a predetermined distance short of the preceding junction, and sets the guidance such that the guidance includes the third phrase for specifying the positional relationship between the movable body and the guidance junction and does not include the first phrase and the second phrase in cases where the guidance provided by the junction guiding unit will be finished before the movable body reaches the point a predetermined distance short of the preceding junction.

8. The travel guidance system according to claim 1, further comprising:
a junction-number acquiring unit that acquires a number of junctions existing between the preceding junction and the guidance junction, wherein
the guidance setting unit sets a phrase for specifying the number of junctions acquired by the junction-number acquiring unit for the second phrase.

9. The travel guidance system according to claim 1, wherein the guidance setting unit sets a phrase indicating that the preceding junction is a junction through which the movable body is about to pass for the first phrase in cases where passage of the movable body through the preceding junction will not be completed while the guidance is provided by the junction guiding unit.

10. The travel guidance system according to claim 1, wherein the guidance setting unit sets a phrase indicating that the preceding junction is a junction through which the movable body is currently passing for the first phrase in cases where passage of the movable body through the preceding junction will be completed while the guidance is provided by the junction guiding unit.

11. The travel guidance system according to claim 1, wherein the junction guiding unit starts the guidance on the guidance junction when the movable body passes through a point specified by a position of the movable body relative to the preceding junction.

12. The travel guidance system according to claim 1, wherein the guidance setting unit sets the guidance such that the guidance includes the first phrase and the second phrase in cases where the guidance provided by the junction guiding unit will not be finished before the movable body reaches a point a predetermined distance short of the preceding junction, and sets the guidance such that the guidance includes the third phrase for specifying the positional relationship between the movable body and the guidance junction and does not include the first phrase and the second phrase in cases where the guidance provided by the junction guiding unit will be finished before the movable body reaches the point a predetermined distance short of the preceding junction.

13. A travel guidance apparatus comprising:
a navigation-route setting unit that sets a navigation route along which a movable body is guided and a guidance junction on the navigation route;
a junction acquiring unit that acquires a position of a preceding junction that is located closer to a departure place of the navigation route than the guidance junction;
a guidance setting unit that sets guidance on the guidance junction; and
a junction guiding unit that provides guidance on the guidance junction on the basis of the guidance set by the guidance setting unit, wherein
the guidance setting unit sets the guidance such that the guidance includes a first phrase for specifying a positional relationship between the movable body and the preceding junction, a second phrase for specifying a positional relationship between the movable body and the guidance junction after the movable body has passed through the preceding junction, and a third phrase indicating a positional relationship between the moving body and the guidance junction before passing through the preceding junction,
wherein the guidance setting unit determines whether the third phrase is suitable as guidance by determining if the third phrase can be started and finished within a predetermined timing, sets the third phrase as the guidance set, and if the third phrase is not suitable, the guidance setting sets the first phrase or the second phrase as the guidance set.

14. A travel guidance method comprising:
setting a navigation route along which a movable body is guided and a guidance junction on the navigation route;
acquiring a position of a preceding junction that is located closer to a departure place of the navigation route than the guidance junction;
setting guidance on the guidance junction; and
providing guidance on the guidance junction on the basis of the guidance set,
wherein setting guidance, in cases where guidance on a guidance junction on a navigation route is provided using set guidance, includes a first phrase, a second phrase, and a third phrase for the guidance on the guidance junction, the first phrase specifying a positional relationship between a movable body and a preceding junction that is located closer to a departure place of the navigation route than the guidance junction, the second phrase specifying a positional relationship between the movable body and the guidance junction after the movable body has passed through the preceding junction, and the third phrase indicating a positional relationship between the moving body and the guidance junction before passing through the preceding junction,
wherein setting the guidance includes determining whether the third phrase is suitable as guidance by determining if the third phrase can be started and finished within a predetermined timing, setting the third phrase as the guidance set, and if the third phrase is not suitable, setting the first phrase or the second phrase as the guidance set.

15. A computer program causing a computer to perform:

A navigation-route setting function of setting a navigation route along which a movable body is guided and a guidance junction on the navigation route;

A junction acquiring function of acquiring a position of a preceding junction that is located closer to a departure place of the navigation route than the guidance junction;

a guidance setting function of setting guidance on the guidance junction; and a junction guiding function of providing guidance on the guidance junction on the basis of the guidance set by the guidance setting function, wherein the guidance setting function sets the guidance such that the guidance includes a first phrase for specifying a positional relationship between the movable body and the preceding junction, a second phrase for specifying a positional relationship between the movable body and the guidance junction after the movable body has passed through the preceding junction, and a third phrase indicating a positional relationship between the moving body and the guidance junction before passing through the preceding junction, wherein the guidance setting function determines whether the third phrase is suitable as guidance by determining if the third phrase can be started and finished within a predetermined timing, sets the third phrase as the guidance set, and if the third phrase is not suitable, the guidance setting sets the first phrase or the second phrase as the guidance set.

* * * * *